C. REDD.
CARTON MACHINE.
APPLICATION FILED APR. 25, 1911.

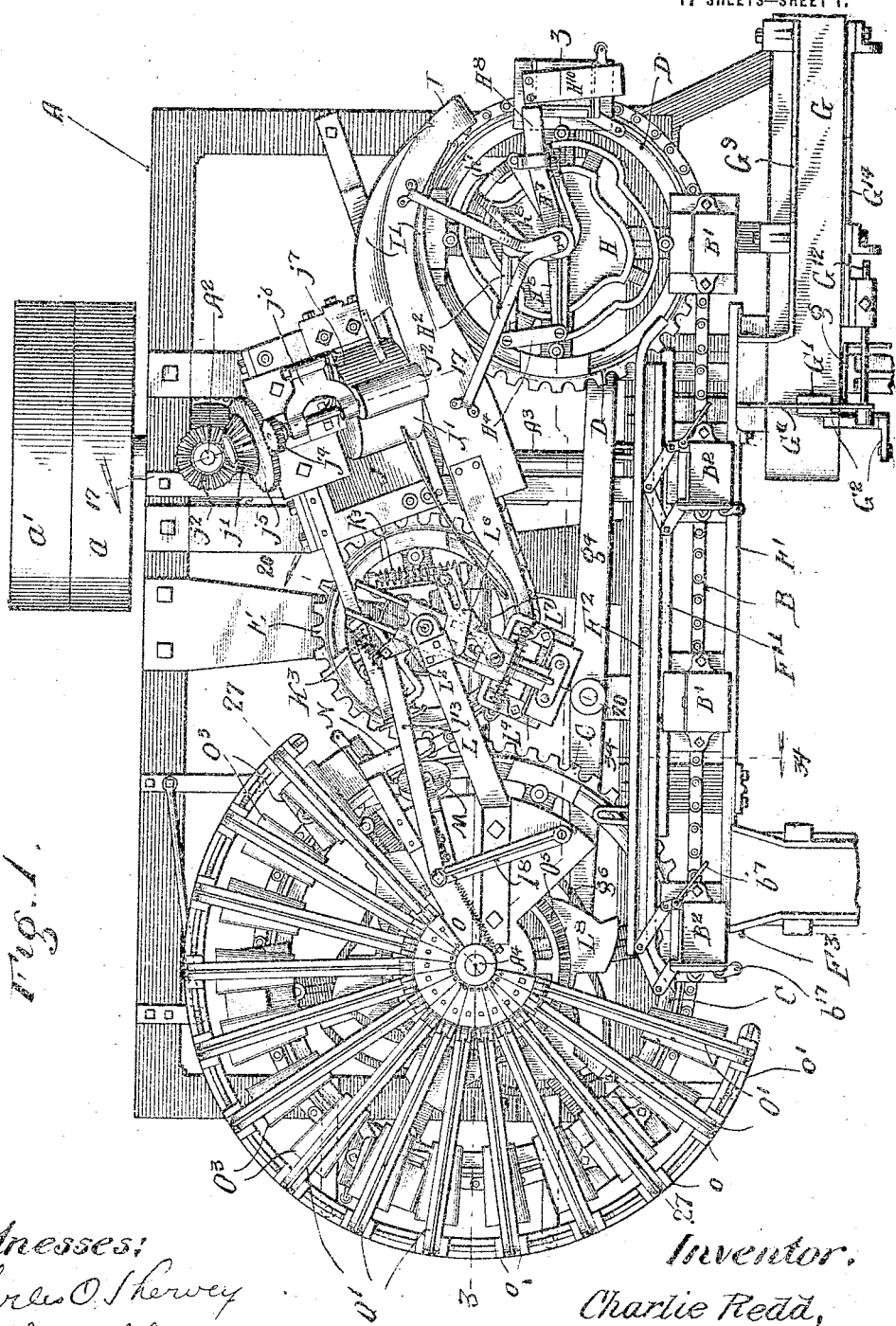

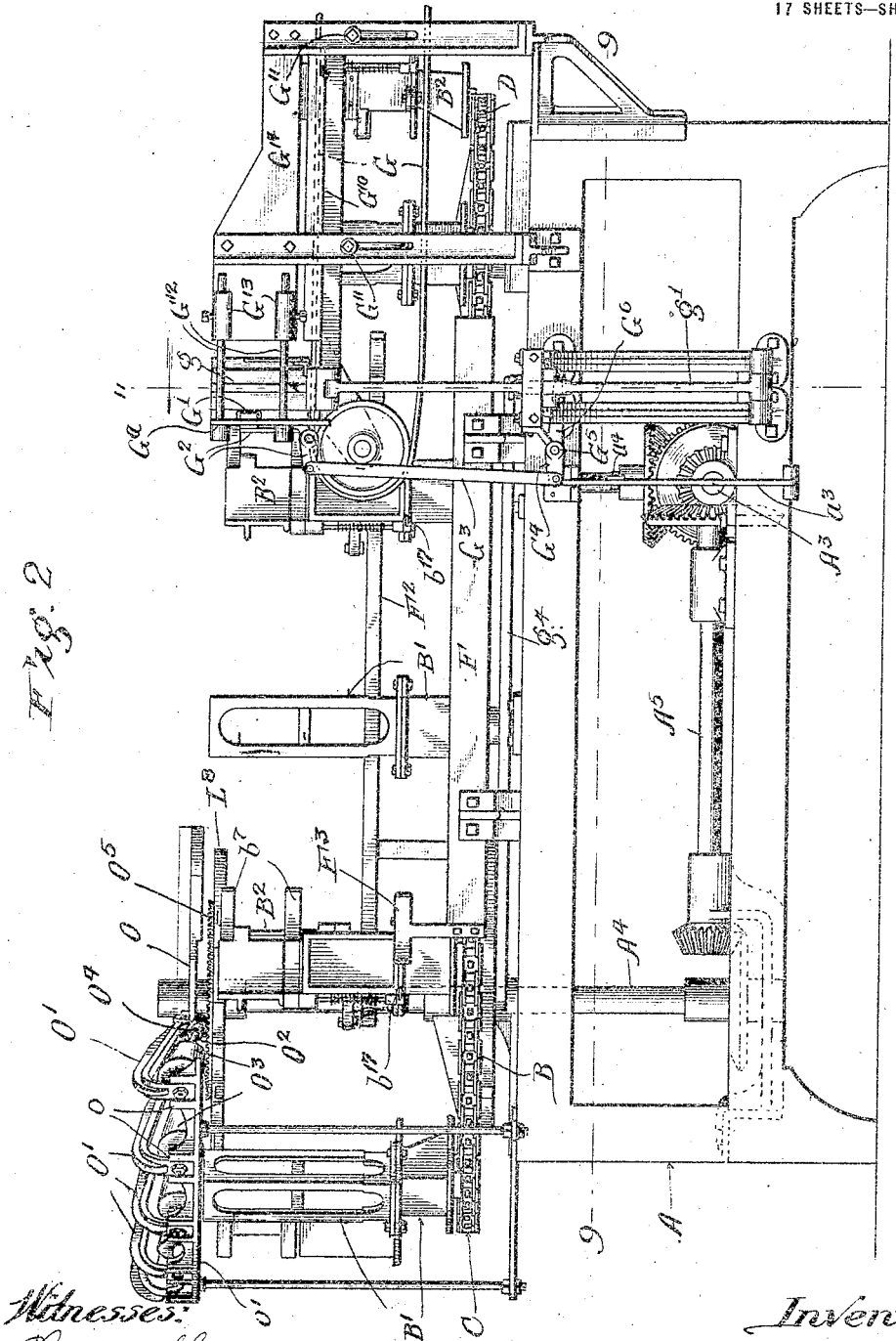

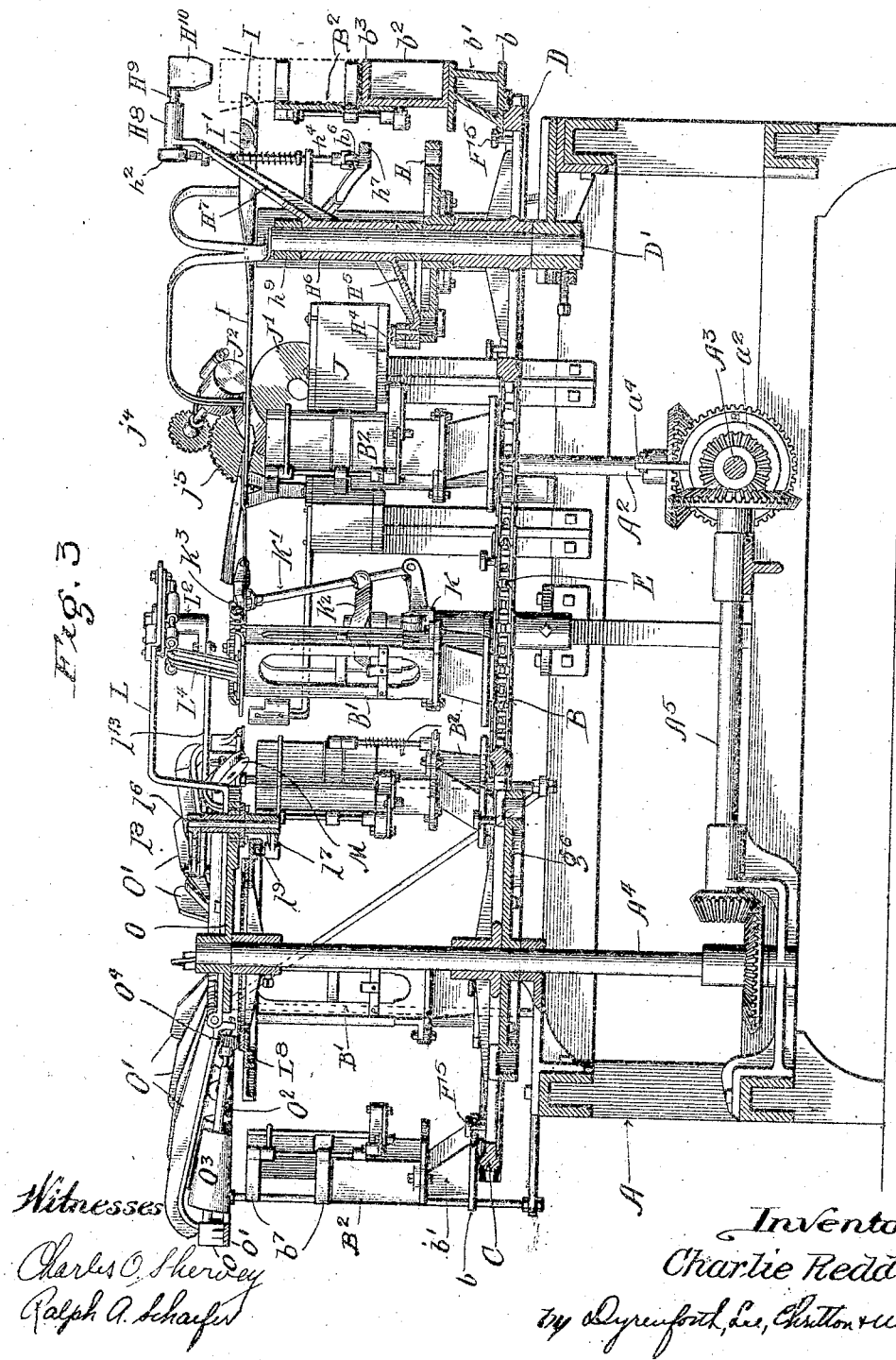

1,153,571.

Patented Sept. 14, 1915.
17 SHEETS—SHEET 4.

Witnesses:
Charles O. Harvey
Ralph A. Schaefer

Inventor:
Charlie Redd,
by Dyrenforth, Lee, Chritton & Wiles
Attys

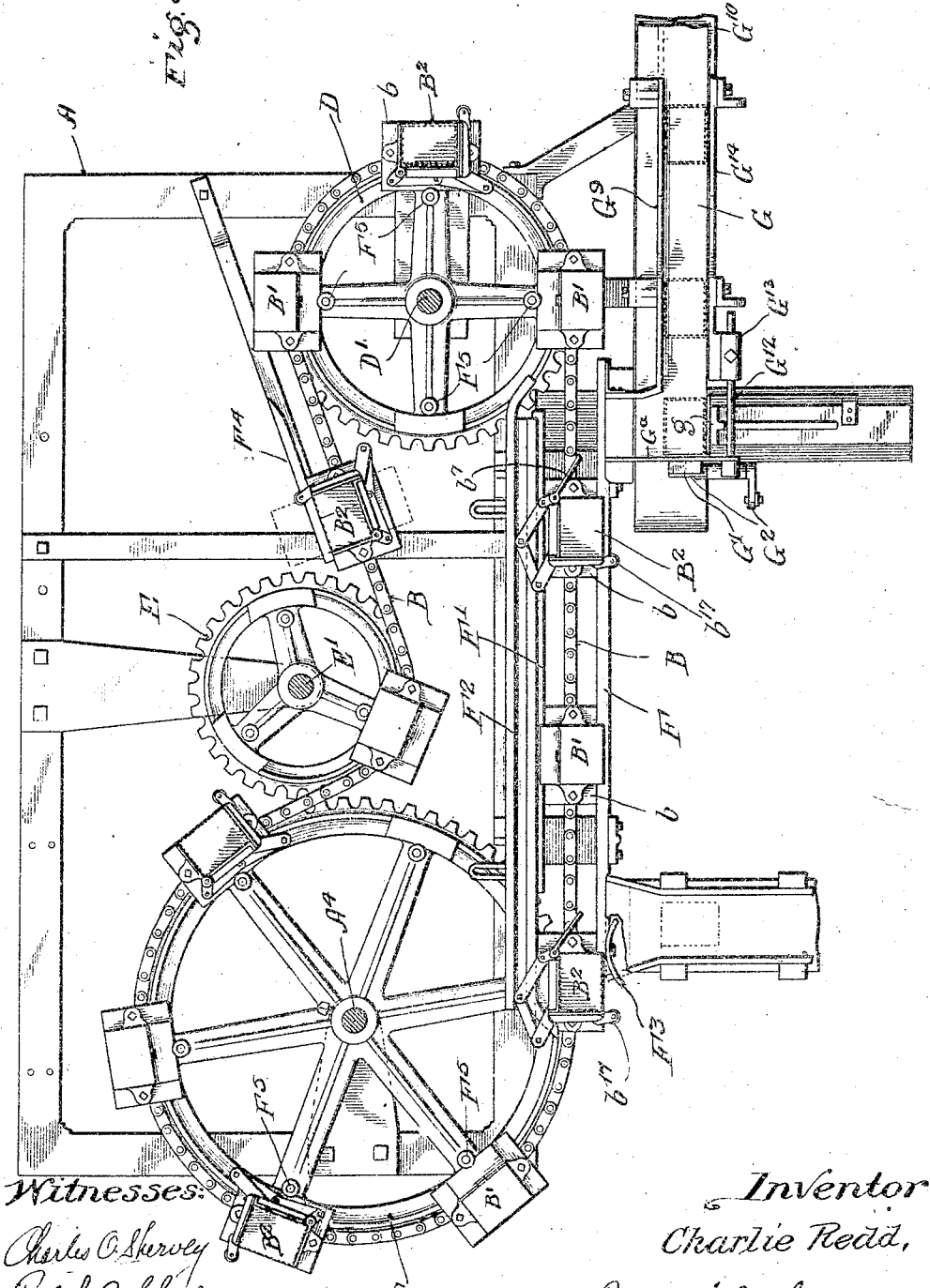

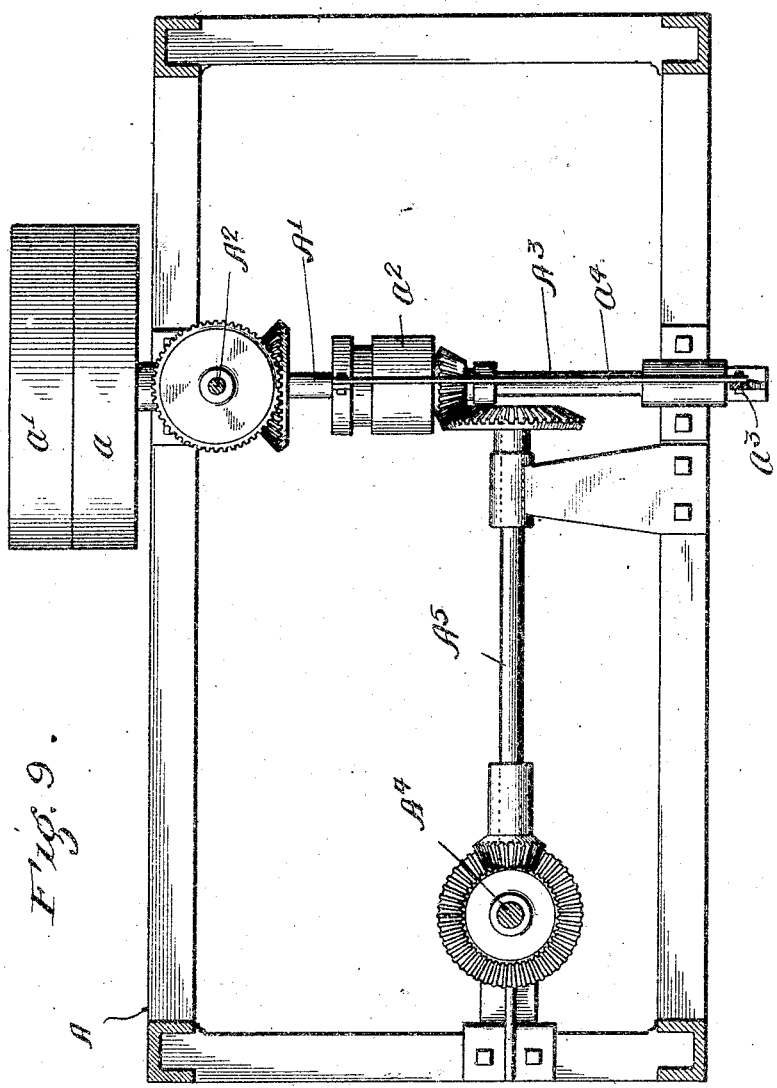

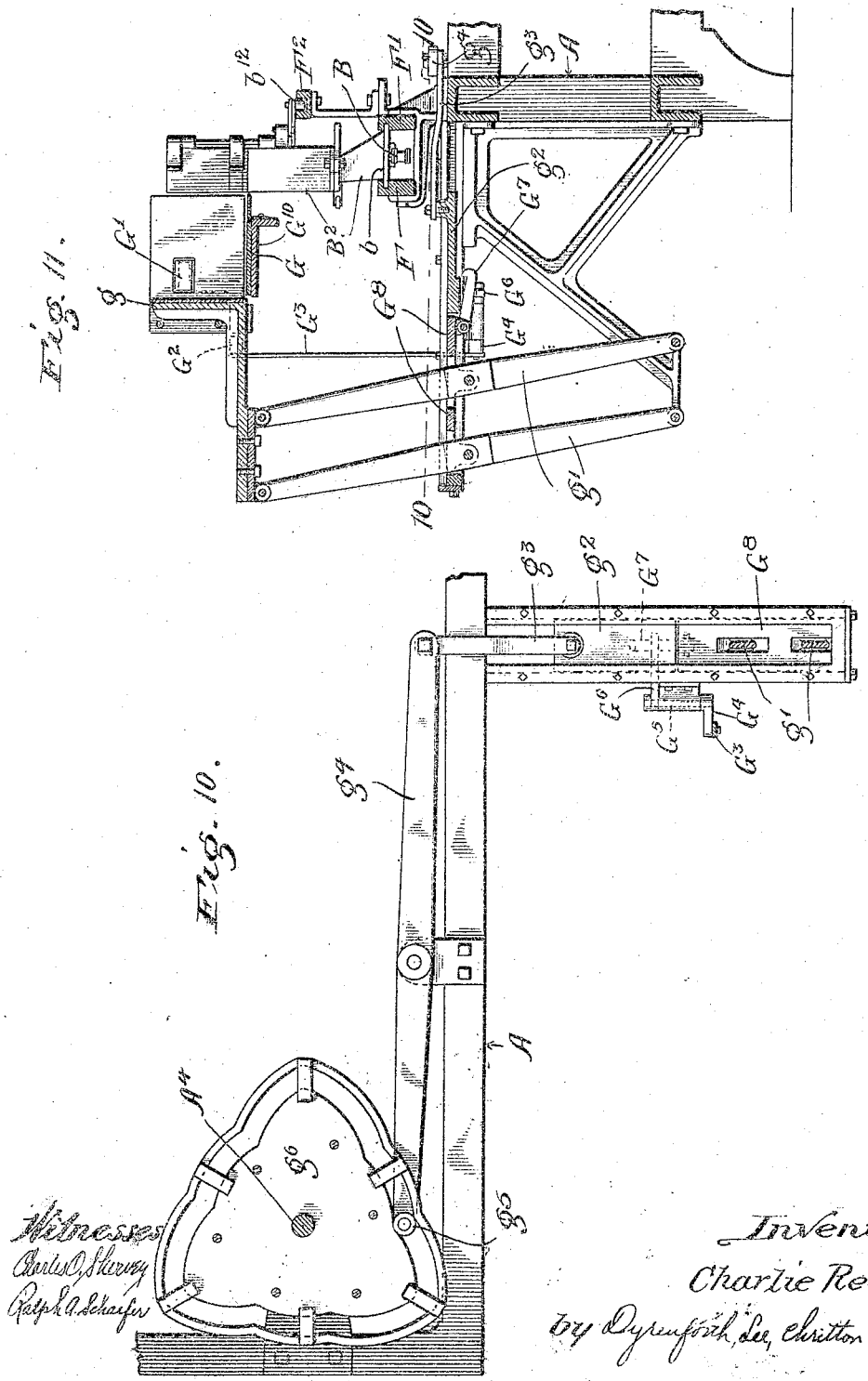

C. REDD.
CARTON MACHINE.
APPLICATION FILED APR. 25, 1911.

1,153,571.

Patented Sept. 14, 1915.
17 SHEETS—SHEET 8.

Witnesses.
Charles O. Shewey
Ralph A. Schaefer

Inventor:
Charlie Redd,

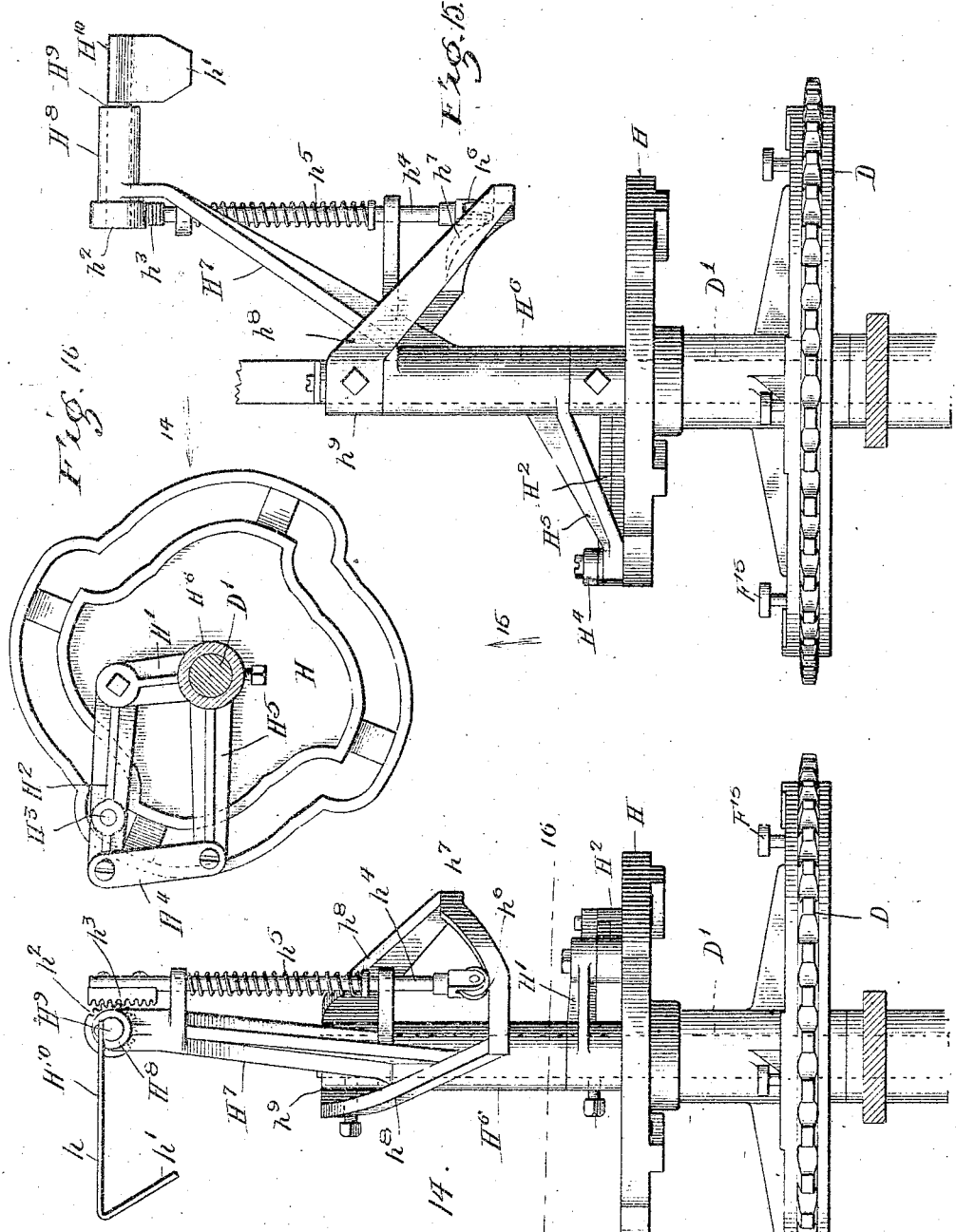

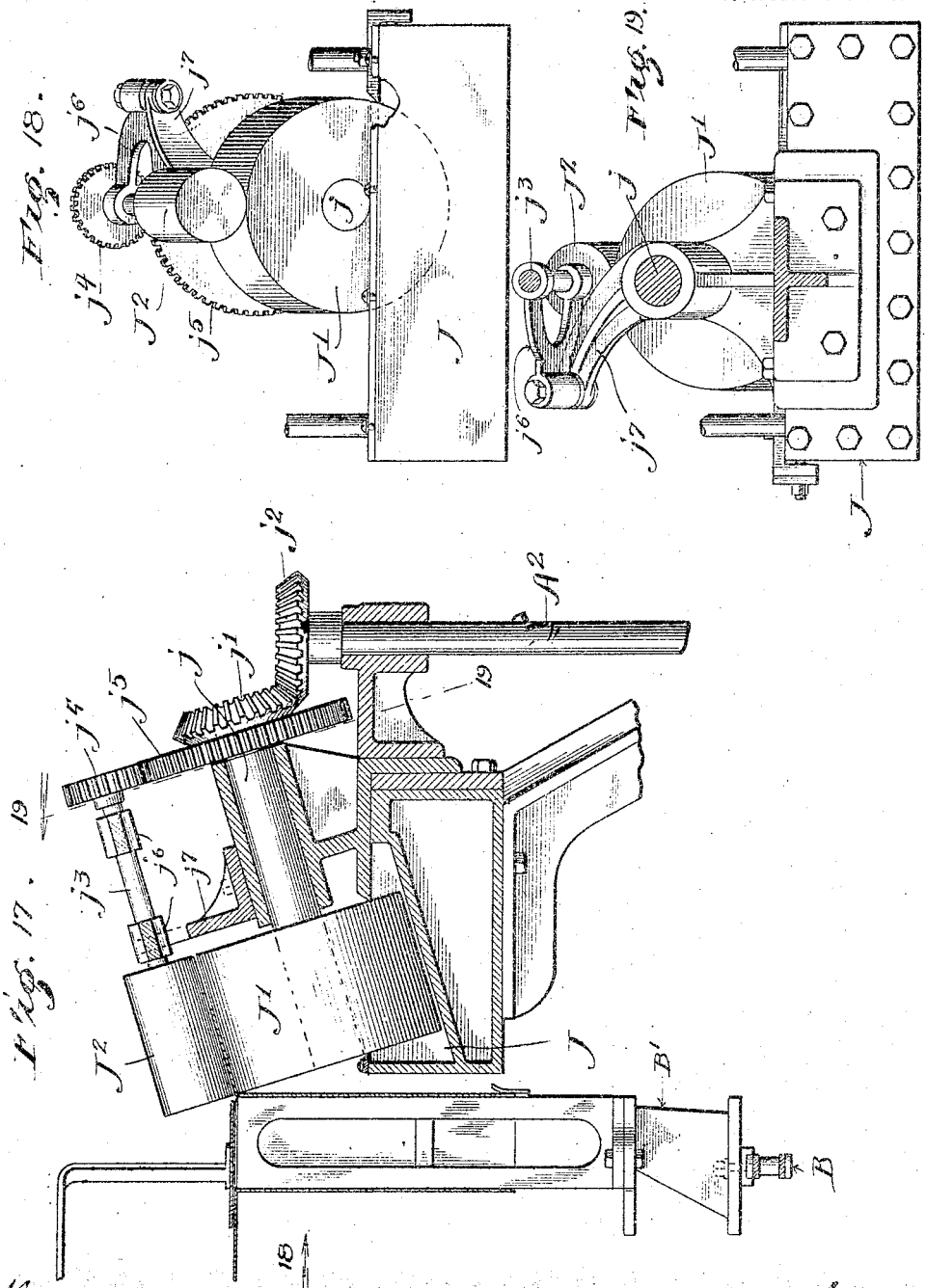

C. REDD.
CARTON MACHINE.
APPLICATION FILED APR. 25, 1911.
1,153,571.
Patented Sept. 14, 1915.
17 SHEETS—SHEET 11.
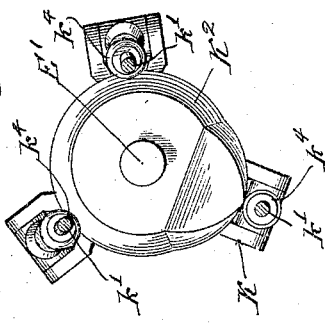
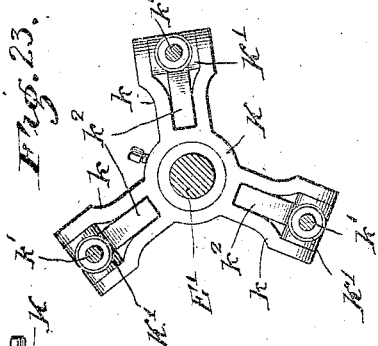
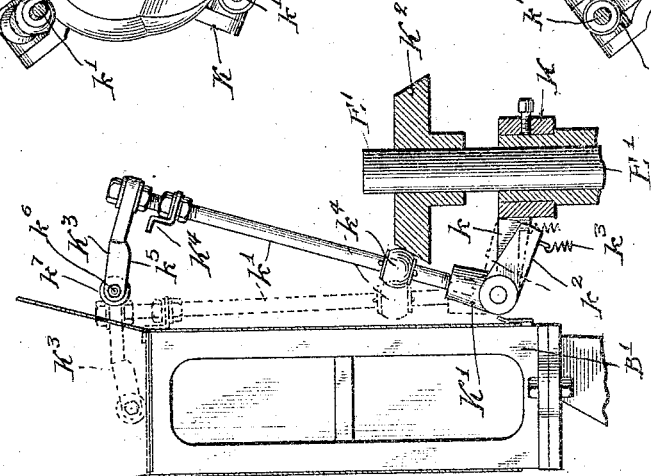
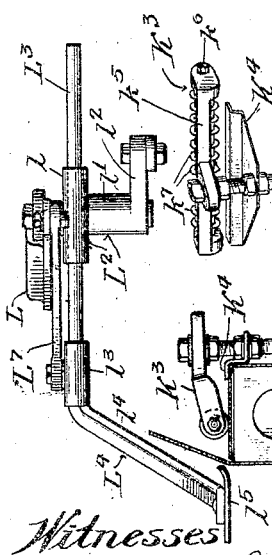
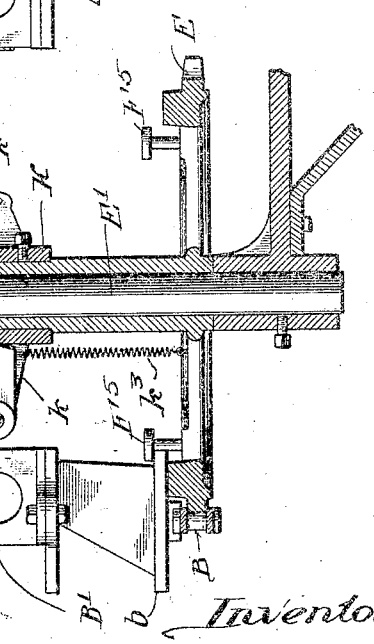
Witnesses
Charles O. Shurvey
Ralph A. Schaefer
Inventor:
Charlie Redd,
by Dyrenforth, Lee, Chritton & Wiles
Attys.

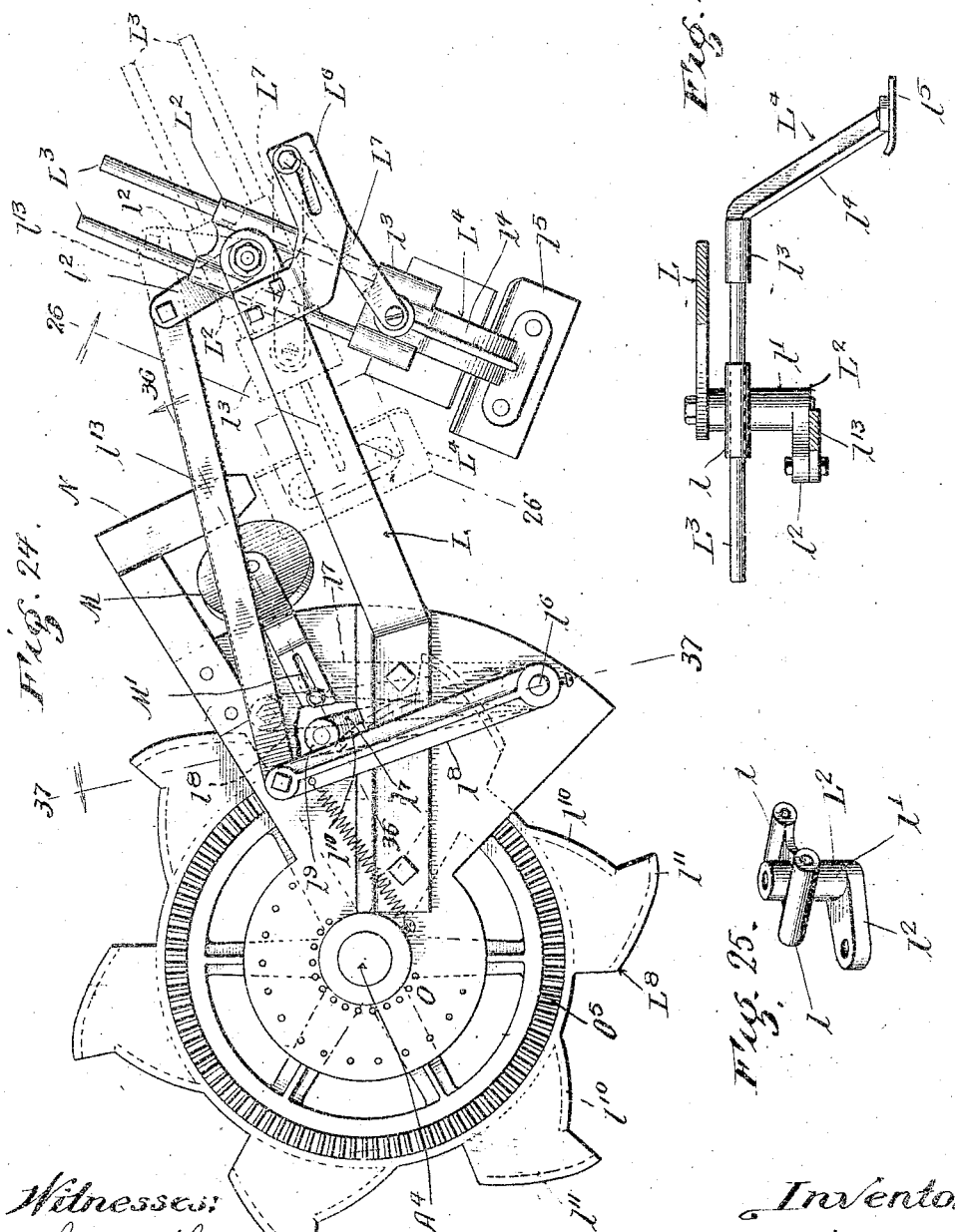

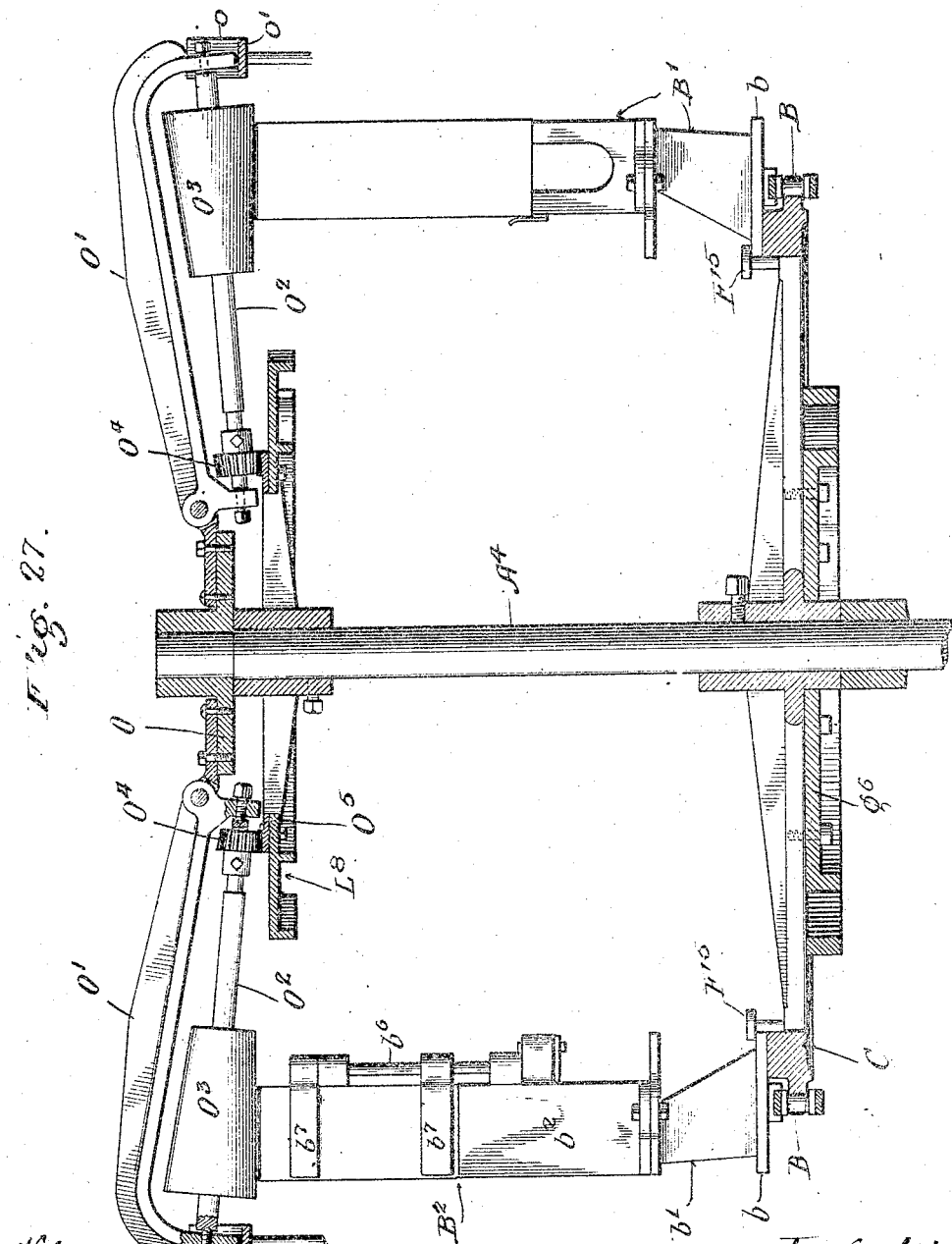

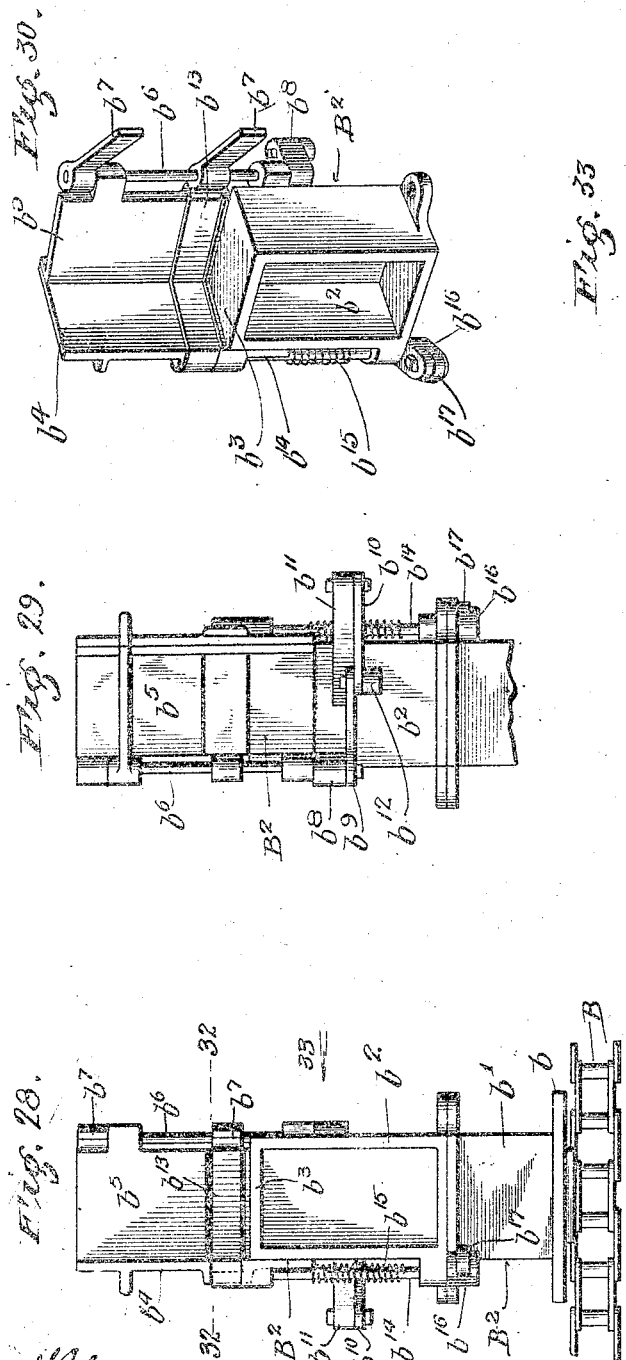
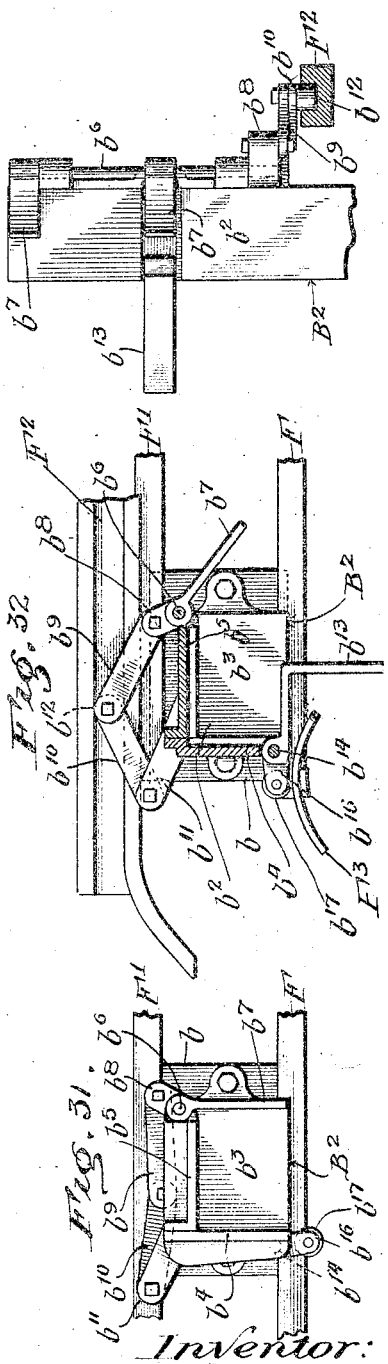

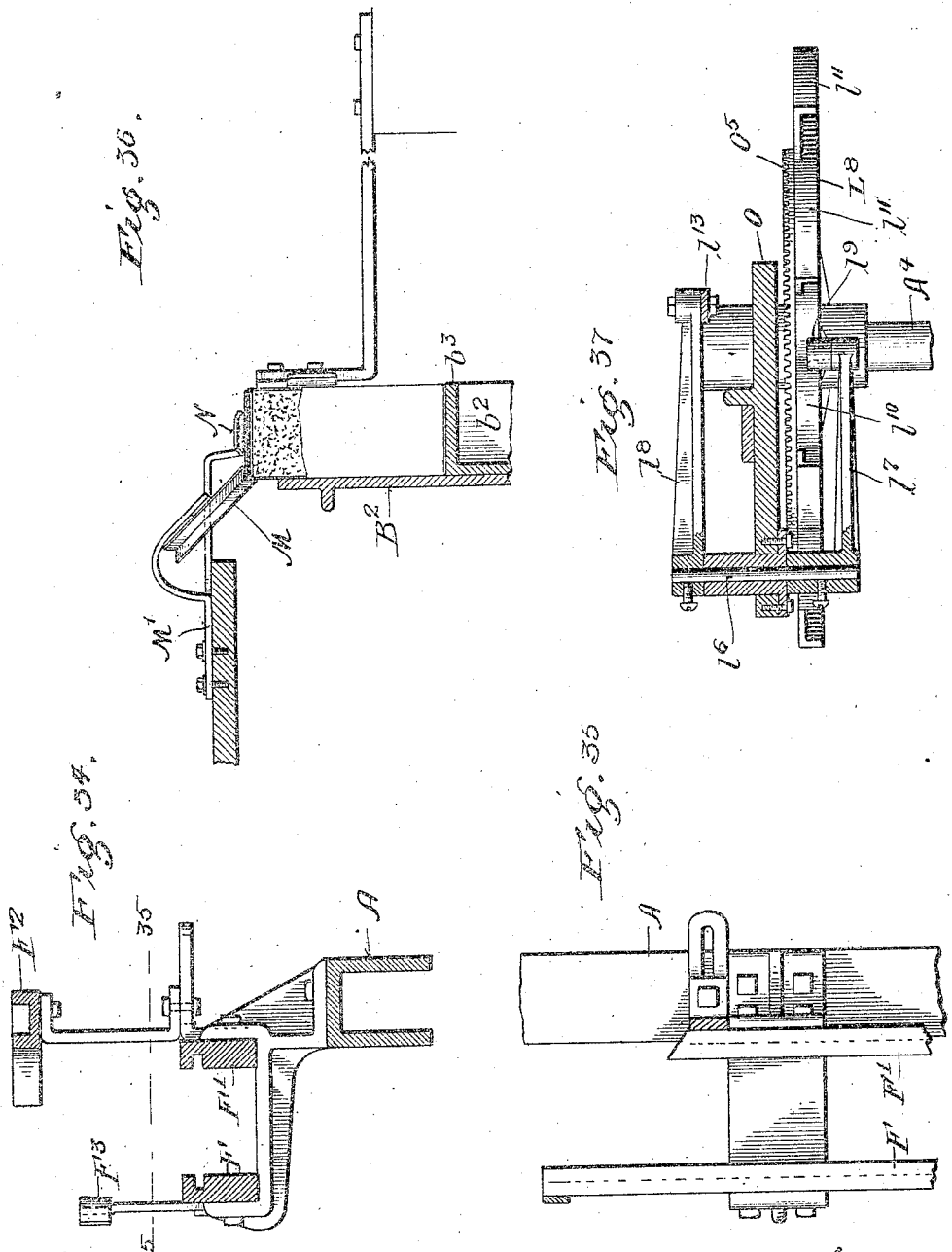

C. REDD.
CARTON MACHINE.
APPLICATION FILED APR. 25, 1911.
1,153,571. Patented Sept. 14, 1915.
17 SHEETS—SHEET 16.
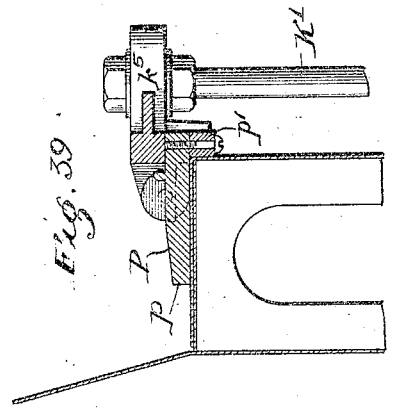
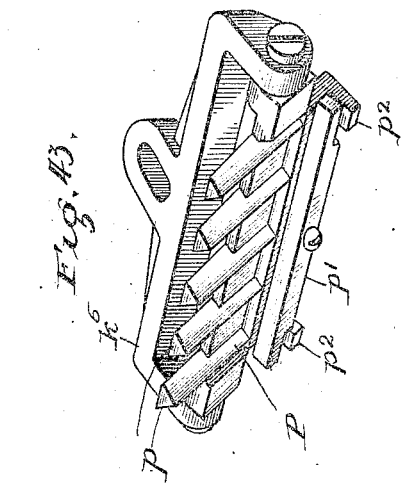
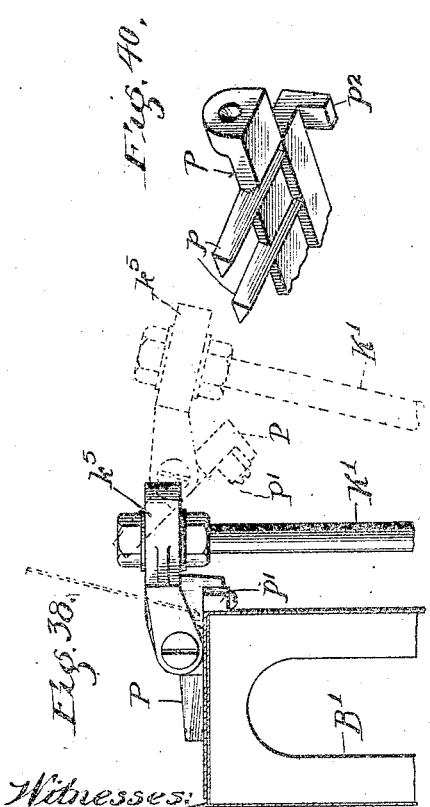
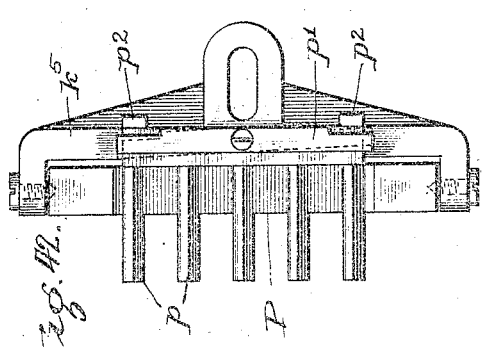
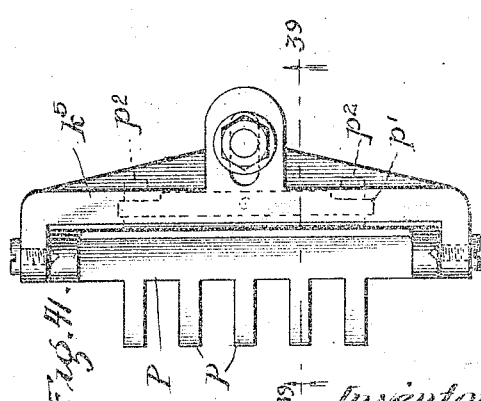
Witnesses:
Charles O. Shurvey
Ralph A. Schaefer
Inventor:
Charlie Redd.
by Dyrenforth, Lee, Chritton & Wiles.
attys.

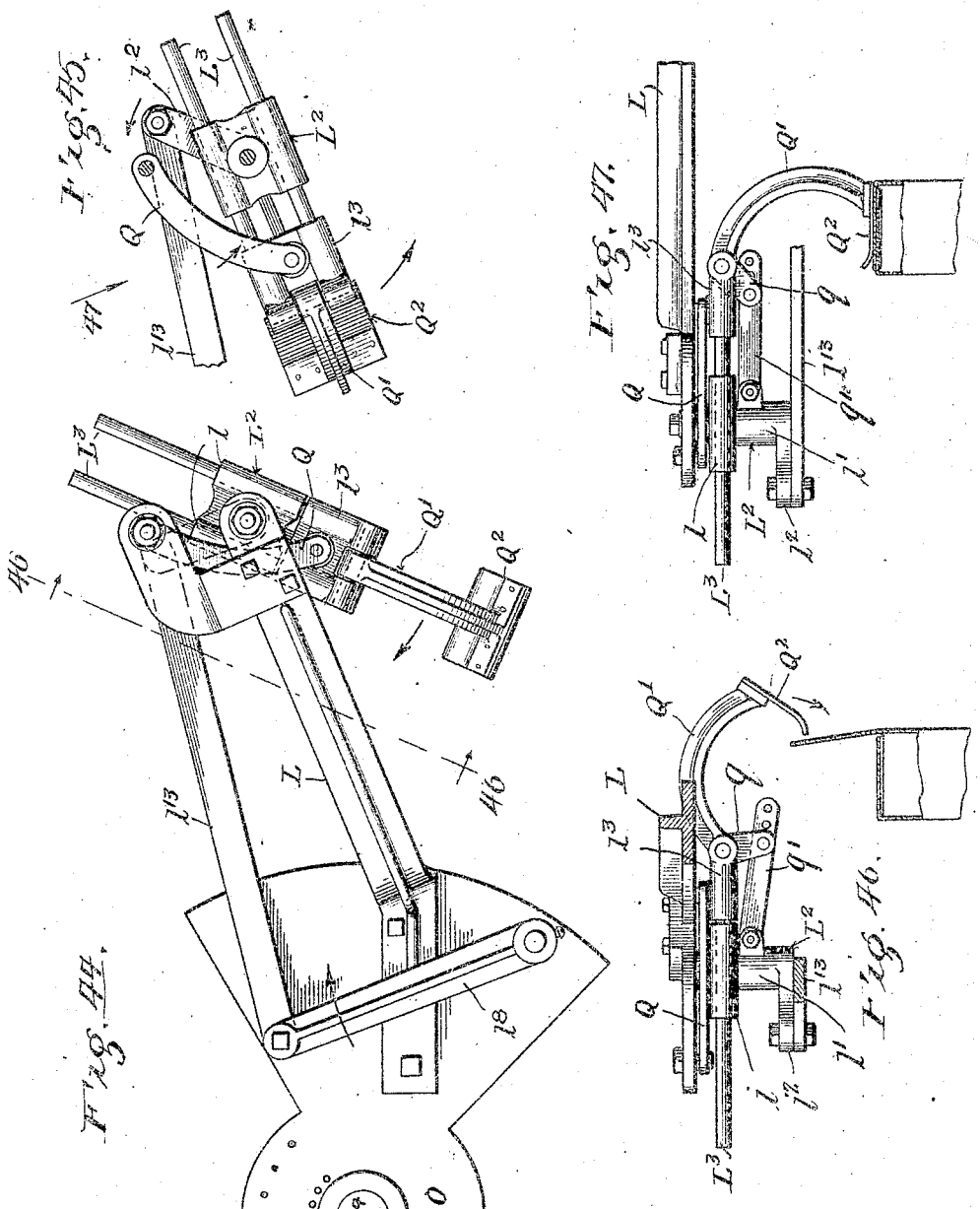

UNITED STATES PATENT OFFICE.

CHARLIE REDD, OF CHICAGO, ILLINOIS, ASSIGNOR TO ISAAC PIESER AND CHARLES G. LIVINGSTON, OF CHICAGO, ILLINOIS.

CARTON-MACHINE.

1,153,571.  Specification of Letters Patent.  Patented Sept. 14, 1915.

Application filed April 25, 1911. Serial No. 623,289.

*To all whom it may concern:*

Be it known that I, CHARLIE REDD, a citizen of the United States, residing at Chicago, in the county of Cook and State of Illinois, have invented a new and useful Improvement in Carton-Machines, of which the following is a specification.

This invention relates to improvements in carton machines described in this specification and illustrated in the accompanying drawings in which:—

Figure 6:
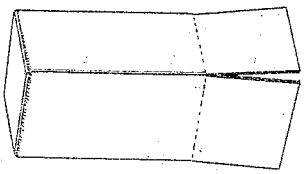
Figure 7:
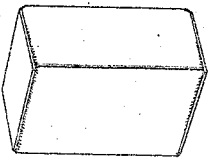
Figure 5:
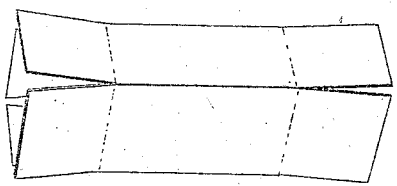
Figure 4:
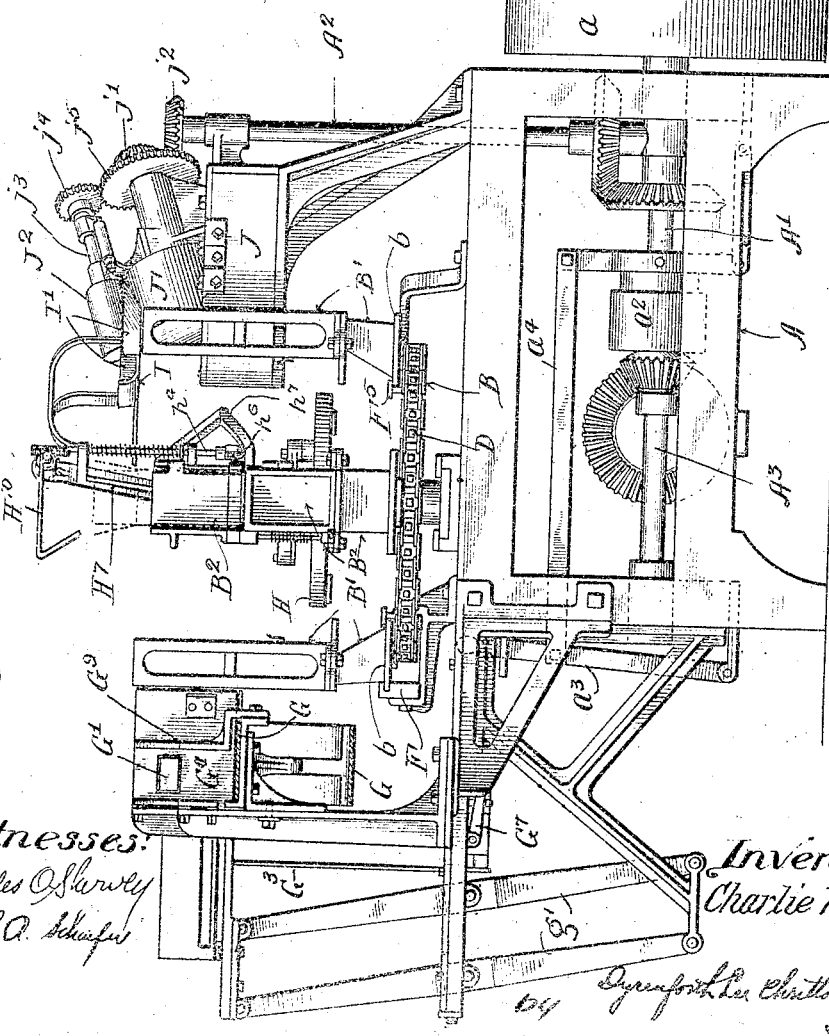
Figure 13:
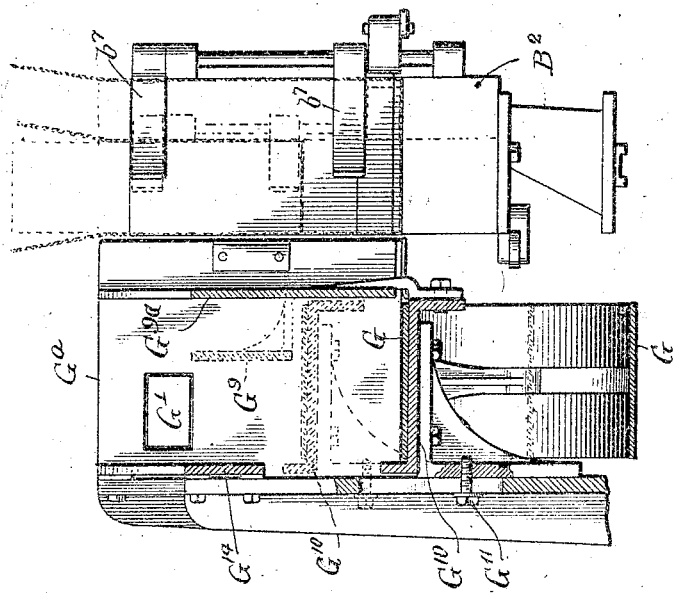
Figure 12:
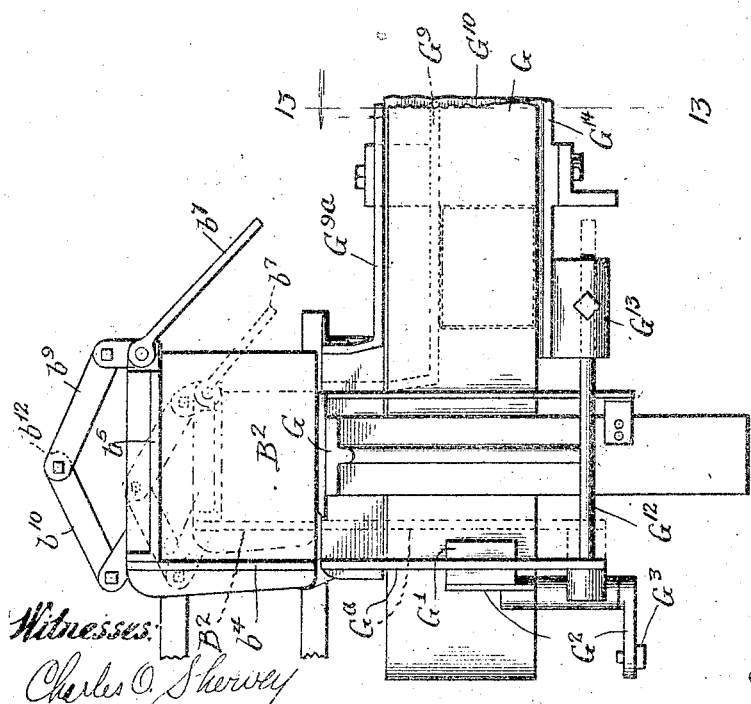

Figure 1 is a plan of the machine; Fig. 2 is a front elevation; Fig. 3 is a section in line 3 of Fig. 1; Fig. 4 is an end view from the right in Fig. 1; Fig. 5 is a perspective of the blank operated on; Fig. 6 is a perspective of the blank with one end closed; Fig. 7 is a perspective of the blank with both ends closed; Fig. 8 is a plan of the conveying mechanism, the parts overlying the same being removed; Fig. 9 is a horizontal section in the line 9 of Fig. 2; Fig. 10 is a horizontal section in line 10 of Fig. 11, showing the feeding mechanism; Fig. 11 is a vertical section in line 11 of Fig. 2 showing the feeding mechanism; Fig. 12 is a detailed plan showing a larger carrier than in the bulk of the figures and corresponding adjustments of the feeding mechanism; Fig. 13 is a section in the line 13 of Fig. 12; Fig. 14 is an end view (i. e., from the right in Fig. 1) of the rear flap folding mechanism; Fig. 15 is a view of the same parts from the left in Fig. 14 on the front of the machine; Fig. 16 is a horizontal section in the line 16 of Fig. 14; Fig. 17 is a section in the line 17 of Fig. 1, showing the gluing mechanism; Fig. 18 is a view of the same parts in the direction of the arrow 18 in Fig. 17; Fig. 19 is a section in the line 19 of Fig. 17 showing the same parts; Fig. 20 is a vertical section in line 20 of Fig. 1 showing the side flap folders; Fig. 21 is a similar view of the first side flap folder adjusted for large cartons; Fig. 22 is a horizontal section in line 22 of Fig. 20; Fig. 23 is a horizontal section in line 23 of Fig. 20; Fig. 24 is a plan of the second side flap folding mechanism; Fig. 25 is a perspective of the swinging cross-head thereof; Fig. 26 is a vertical section in line 26 of Fig. 24; Fig. 27 is a vertical section in line 27 of Fig. 1; Fig. 28 is a view of a carrier from the side on which cartons enter (i. e., a front view of one of the carriers shown at the lower part of Fig. 1); Fig. 29 is a view of the same from the opposite side; Fig. 30 is a perspective of the same; Fig. 31 is a plan of the same; Fig. 32 is a horizontal section of the same in line 32 of Fig. 28; Fig. 33 is a view of the same parts in the direction of the arrow 33 in Fig. 28; Fig. 34 is a vertical section in line 34 of Fig. 1; Fig. 35 is a horizontal section in line 35 of Fig. 34; Fig. 36 is a vertical section in line 36 of Fig. 24 showing the truing roller; Fig. 37 is a vertical section in line 37 of Fig. 24 showing the second side flap folder driving means; Fig. 38 is an elevation similar to the upper part of Fig. 21 showing a modified first side flap folder; Fig. 39 is a vertical section in line 39 of Fig. 41 of the same parts; Fig. 40 is a perspective from below of the contact piece of said modification; Fig. 41 is a plan of the modification; Fig. 42 is a bottom plan of the top of the modification; Fig. 43 is a perspective of the top of the modification; Fig. 44 is a plan of a modified second side flap folder; Fig. 45 is a similar view with certain parts cut away but showing the parts in a different position; Fig. 46 is a vertical section in line 46 of Fig. 44; Fig. 47 is a view in direction of arrow 47 in Fig. 45 of the same parts in that position.

*General outline of operation.*—At the outset of the description of my improved machine I shall set forth in a general way the object which it accomplishes and the operations which it performs, in order that the detailed description of the mechanical contrivances which is to follow can be more readily understood. My machine is designed for sealing the ends of cartons of the type formed of a tubular blank with four flaps at each end. These blanks are furnished to users thereof with the longitudinal seam between the meeting edges of the pasteboard already sealed the edges marked by scoring and the entire structure folded into a flat shape. The user of these cartons must necessarily fold and glue the bottom flaps of the cartons, then fill them with the material which they are eventually to contain and then seal the top flaps to inclose the material. It has heretofore been customary in the majority of carton sealing machines to seal either the tops or the bottom on a single machine, but my improved machine provides facilities for sealing both the top and bottom flaps of cartons and therefore necessarily contains suitable holding means for cartons in their original condition with both top and bottom flaps projecting upward and downward and also for cartons after the bottoms have been sealed and material has been placed within the cartons.

In my machine I provide an endless conveyer which carries a series of blocks adapted to hold the cartons in their original condition and also a series of filled carton holders adapted to hold cartons after the bottoms have been sealed with material. These two types of carton holders are arranged alternately upon the conveyer. The cartons in their original condition are slipped over the blocks by hand in the usual way and removed by hand or by compressed air after the sealing operation is completed, the operative or operatives who perform this work standing between the point of entrance and the point of exit of the series of cartons. Except for the difference in the manner in which the cartons are placed upon or in the carriers the filled cartons and cartons whose bottoms are to be sealed are treated in exactly the same way and I shall, therefore, confine my future descriptions of the general operation of the machine to its operation upon filled cartons, it being understood that between each two filled carton carriers is placed a block upon which cartons may be placed at will for the purpose of having their bottom folded and sealed.

The filled cartons are placed upon a suitable conveyer belt and are thereby brought to the machine where they are engaged successively by a suitable feeding device, which feeding device operates to force the cartons into the holders therefor which are carried as aforesaid by the endless conveyer. It will be understood that this feeding device is timed so as to operate only when the carton holders for filled cartons are in position to receive the same so that when a carton leaves the feed belt it immediately enters one of the carton holders. As soon as the carton enters the holder, which consists of a bottom, a rear piece and one side, a suitable cam-operated holding device is brought into action which swings up and clamps the carton firmly against the rear of the holder. The holder is then carried by the endless conveyer about a sprocket-and-cam-wheel and during its movement around the same is first engaged by a rear flap holder carried by an arm which swings on the center of said sprocket-and-cam-wheel so that the holder moves with and substantially at the same speed as the carton and while following it in this manner is swung down to engage the rear flap of the carton and fold it down into place. Immediately after this flap is thus folded the carton, still continuing its course around the sprocket-and-cam-wheel engages with its front edge a stationary front flap folder which forces the front flap down over the rear flap. Immediately after this action the two side flaps are engaged by a suitable deflecting device which spreads them apart and one of the side flaps passes between two glued rollers so as to receive glue both on its inner and outer, or its lower and upper surfaces. The application of glue to this flap in this manner occurs just after the carton has passed from the periphery of the cam and sprocket wheel, and is traveling in a straight course with the endless conveyer. As the carton moves on the glued flap engages the stationary deflector which gradually turns it up from a substantially horizontal position to the outside into a position substantially vertical or inclined endward to a slight extent. It will be understood that no true folding action is performed by this guide, its only action being to raise the flap into position to be acted upon by a suitable folder. I call particular attention to this feature because it has been found in the use of carton machines that any actual folding done by a stationary folder which slides along the flap has a tendency to twist the flap and produce an inaccurate fold.

After the glued flap of the carton is turned up as aforesaid the carton holder is carried by the endless conveyer around a portion of the periphery of a second wheel which said sprocket wheel carries a plurality of radially movable side flap folders. It is obvious that while the carton is moving about the periphery of this wheel the side flap folders which are carried by the wheel, will have no relative movement with respect to the cartons in a longitudinal direction. Immediately after the carton begins to follow the periphery of this sprocket-wheel one of the side flap folders is projected radially outward and encounters the glued flap folding it down upon the front flap and the rear flap which have already been acted upon as set forth. The side flap holder is then immediately retracted but is followed up by a second flap folder which is mounted upon an arm which runs about the center of rotation of said second sprocket-wheel and is provided with mechanism, whereby it can be reciprocated along said arm. This second side flap folder contacts with the second side flap of the carton and immediately folds it down upon the first side flap so as to engage the upper glued surface thereof. This second side flap folder follows the carton until it has substantially finished its traverse of the periphery of said second sprocket-wheel, at which time the said side flap is retracted and returned into position to act upon the next carton. The carton then passes under a small squaring roller having a right-angled groove in its periphery, which groove trues up the last fold and the carton holder then passes about the periphery or a portion of it of a third and larger sprocket-wheel. During the course of this movement the carton passes under a series of heavy conical rollers which press the glued flaps firmly together and holds them together until the glue has set. The carton passes out from under the last roller of the series just as it completes its traverse of the periphery of said third sprocket-wheel and at this point, by a suitable cam, the carton clamping device of the carton holder is released. Immediately thereafter an ejector carried by the carton holder is operated and this ejector pushes the carton from the holder into a suitable discharge trough. As before stated the operation for cartons whose bottoms are to be sealed is exactly the same in all particulars except that they are placed upon the blocks by hand and are removed by hand. The cartons carried by these blocks pass around all three sprocket-wheels and have their side flaps operated upon in exactly the same way as do the cartons whose progress has already been set forth.

Having this general description of the operation of my machine and the general purpose of the various parts thereof, I shall now set forth the details of construction by which operative mechanism for producing these various results are secured. Certain parts of the structure can be very greatly modified if desired without departing from the spirit of my invention, while other parts are perhaps shown in the best embodiment for producing satisfactory results. Therefore, while I shall set forth with the greatest detail the actual construction of my machine, I fully realize that it can be modified and I do not intend to limit myself by such accuracy of description except as I shall hereafter point out in the claims wherein the particular features of my invention reside.

*Frame and shafting.*—Referring to the drawings, A is the frame of my machine, which may be constructed in any desired form and of any material suitable for supporting the working parts, although, I prefer to form the same substantially as illustrated in the drawings and in a rectangular form with longitudinal and transverse bars connecting the corners both at the top and at a point a short distance from the bottom of the frame.

$A^1$ is the main driving shaft of my machine, the same being provided with tight and loose pulleys adapted to be connected with any suitable source of power. The main driving shaft $A^1$, which is normally kept in continuous rotation, is connected by suitable miter gears with a glue-wheel drive-shaft $A^2$, extending in a vertical direction at the rear end of the machine.

$A^3$ is a shaft in line with the shaft $A^1$ and adapted to be connected therewith by means of a clutch $a^2$ which can be operated by means of a hand-lever $a^3$, connecting therewith links $a^4$.

$A^4$ is a vertical drive-shaft driven from the shaft $A^3$ by means of a transmission shaft $A^5$ provided with miter gears which mesh with corresponding gears on the shafts $A^4$ and $A^3$ respectively. The vertical drive-shaft $A^4$ imparts motion to all the operating parts of the device excepting the glue-wheel so that when the clutch $a^2$ is disconnected the entire movement of the machine will cease. I drive the glue-wheel from the continuously rotating main drive-shaft $A^1$ because, owing to the viscous nature of the glue, the glue-wheel should be kept in practically continual motion to prevent clogging and drying of the glue on its surface.

*Conveyer chain and its path.*—Referring now to Fig. 8, B is a conveyer chain running over and driven by a main conveyer sprocket wheel C mounted upon the upper end of and driven by the vertical drive-shaft $A^4$ aforesaid. At the opposite end of the machine from the end conveyer sprocket C is a conveyer idler D rotatably mounted upon a vertical shaft $D^1$ suitably supported in the frame of the machine. It will be seen that the forward points on said two sprockets are in substantially the same line so that the chain running between them follows a straight longitudinal course along the front of the machine. The conveyer idler, however, is of smaller diameter than the main conveyer sprocket C and between these sprockets and at the rear of the machine is an intermediate conveyer idler E mounted upon a vertical shaft $E^1$ also supported by the frame of the machine. It will be seen that the chain B runs outside the main conveyer sprocket C and the conveyer idler D, these two wheels being inclosed by the curve of the chain, while the intermediate conveyer idler E lies outside of the curve of the chain bending the same into a reverse curve as illustrated.

$B^1$ are the blocks carried by the chain B and adapted to receive the cartons whose bottom flaps are to be folded. These blocks require no particular description at the present time except to point out that each one has at its lower end a plate $b$ which is adapted to be engaged by and run in suitable guiding devices which will be hereinafter set forth.

$B^2$ indicates generally the holders for the filled cartons whose top flaps are to be closed. These holders are likewise mounted upon and carried by the chain B and I shall proceed to describe their construction in detail. Before doing so, however, I will point out that each of them has a bottom plate $b$ projecting beyond the general outlines of the holder and adapted to be engaged by the guiding means in the same manner as the plates $b$ on the blocks are engaged. This guiding mechanism will be set forth more particularly hereafter.

*Filled carton holders and coöperating devices.*—The construction of the carton holder $B^2$ is illustrated in detail in Figs. 28 to 33 inclusive and reference will now be had to said figures to illustrate such construction. It will be seen that the plates $b$, already referred to, are at the extreme bottom of the holders and just above the chain B to which they are secured. These plates form preferably an integral part of a base $b^1$ to which is bolted on each of the holders, a hollow vertically extending rectangular box $b^2$ the top plate $b^3$ of which forming a surface upon which the cartons rest. It will thus be seen that the filled carton holders are given a considerable vertical extension. This is partly caused by the fact that such portions of the operating mechanism of the machine are necessarily placed above the level of the conveying chain B and the cartons must be above the level of this mechanism and partly by reason of the fact that the tops of the filled cartons must be brought to the same height as the tops of the empty cartons which are necessarily higher than the filled cartons by the length of the bottom flaps which are folded in the filled cartons and not yet folded in the unfilled cartons which fit upon the conveying blocks aforesaid. Above the surface $b^3$ extends a backplate $b^4$ which lies behind the carton held by the holder and on the inside of the surface $b^3$ is an upwardly extending plate $b^5$ which lies inside the cartons. The plates $b^5$ have journaled to their forward edges vertical shafts $b^6$ on which are mounted clamping fingers $b^7$ capable of oscillation from the position shown in Fig. 32 to the position shown in Fig. 31 and when so operated these fingers will clamp a carton between themselves and the back plate $b^4$. Near the lower end of the shaft $b^6$ is secured a projecting arm $b^8$ connected to one end of a link $b^9$, the opposite end of which is secured to a link $b^{10}$, the opposite end of the said ink $b^{10}$ being pivoted to a bracket $b^{11}$ secured to the hollow box $b^2$. The pivot between the links $b^9$ and $b^{10}$ carries an antifriction roller $b^{12}$ and it is obvious that as such roller is moved inward from the position shown in Fig. 32, the locking fingers $b^7$ will be swung up to the position shown in Fig. 31 and that when they reach this position the pivot between the link $b^9$ and $b^{10}$ will have passed the dead center, or the line connecting the pivot of the link $b^{10}$ on the bracket $b^{11}$ and the pivot of the link $b^9$ and the arm $b^8$ so that the parts will be locked in position. When the cartons enter the machine the fingers are in the position shown in Fig. 32, but immediately after their entrance the roller $b^{12}$ is engaged by suitable mechanism which forces it inward, thus moving the clamping fingers into position to hold the carton in place and locking the fingers in this position. After the completion of all the operations which are performed upon the carton other mechanism engages the rollers $b^{12}$ to move them out of the position shown in Fig. 32 to release the carton. The plates $b^4$ and $b^5$ of the carton holder $B^2$ are channeled out to receive a right-angled ejector $b^{13}$ which is mounted upon the upper end of a rock-shaft $b^{14}$, which rock-shaft is normally held by a spring $b^{15}$ in such position that the ejector lies within the channel thus formed. The lower end of the shaft $b^{14}$ carries a projecting arm $b^{16}$ in the end of which is mounted a roller $b^{17}$ which can be engaged by suitable mechanism to rotate the rock-shaft $b^{14}$ and cause the movement of the ejector to force a carton out of its carrier. This operation of the ejector takes place after the locking fingers in the carton holder have been released and forces the carton operated upon out into a discharge trough presently to be described.

Having now described the actual construction of the various carton holding devices and the general course which they take through the machine, I shall next set forth the devices which guide and hold the carton holders in their course, the devices which operate directly upon the rollers for the purpose of causing the locking of the cartons therein and their ejection therefrom. The cartons enter the machine from the feed belt at the right hand end of the straight course of the cartons from the main conveyer sprocket to the conveyer idler. During practically the entire movement of the cartons between these two wheels, the plate $b$ at the lower ends of the carton carriers are engaged by and run in slotted carriers F, F$^2$ on the two sides of the path of travel of the chain B. These guides are illustrated in cross-section in Fig. 34 and their arrangement will be readily apparent therefrom. Along the same path of travel of the carton carriers, and higher up, is a cam track F the two ends of which are curved toward the path of the chain B and a central portion of which is parallel thereto and a greater distance away therefrom than the ends. After the carton carriers leave the main conveyer sprocket C the rollers $b^{12}$ thereon are engaged by said cam track and moved outward, thus unlocking the clamping fingers $b^7$ so that the carton may be moved from position in the holder. The holders move on with the fingers released and in the position shown in Fig. 1 until they reach the point where the cartons enter the machine. Immediately after passing this point the rollers are forced inward by the opposite end of the cam track $F^2$ thus locking the cartons again in place. The ejector $b^{13}$ is operated by means of a cam $F^3$ (Fig. 32) which contacts with the rollers $b^{17}$ as they pass a point just at the beginning of the straight course from the main conveyer sprocket to the conveyer idler. The position of this cam is clearly illustrated in Fig. 8.

It will thus be understood how the carton carriers are guided during this portion of their operation and how the cartons are locked in place, how they are released and how they are ejected from the holder. It is necessary, however, that some steadying means for the cartons be provided while they are being carried by the chain particularly during those portions of the movement in which they are being operated upon. It will be understood from the general description of operation that the front and rear flaps of the carton are folded while it is passing around the conveyer idler D, that glue is applied during this straight path from the conveyer idler to the intermediate idler, that the side flaps are folded while the carton is passing about the intermediate idler, and that while passing about the main conveyer sprocket the cartons are pressed firmly by suitable rollers so as to cause the glue to set properly. Since it is necessary to provide some steadying means for the cartons at these points, a slotted guide $F^4$ (Fig. 8) is provided to steady one side of the carton carriers during the straight traverse between the conveyer idler and the intermediate idler. The side which is steadied is obviously that side on which the flap is located to which glue is being applied. For the purpose of steadying the carton holders and carriers during their traverse about the various wheels aforesaid I provide near the end of each of the spokes of the wheels buttons $F^5$, in the form of rollers, adapted to lie over the edges of the plates $b$ at the bottom of the holders. It is to be observed that the number of teeth on the various wheels between the spokes is the same in all cases, and this number of teeth is the same as the number of teeth in chain between any two of these holders, so that the various holders in their course through the machine and around the various wheels, will necessarily take the proper position with reference to the spokes of the wheel and the button $F^5$ aforesaid to insure proper action thereof. Thus the use of the single button engaging each holder gives the carton a perfectly firm bearing in reference to the wheel in all cases, for the link to which the carton is secured gives practically two points of support on the wheel while the button gives a third point of support.

This substantially concludes the description of the various forms of carton holders, the devices which operate directly upon them and the means by which they are guided in their course through the machine. My present machine is given a very large capacity for adjustment in practically all its parts so that it can be used with cartons of various sizes if desired. Certain of these features of adjustment appear in the carton holders. I shall, however, at another point discuss all the capacities for adjustment of my improved machine together and shall therefore omit at the present time any discussion of this part of the construction, and shall proceed immediately to describe the various devices which operate upon the cartons carried by the holders.

*The feeding mechanism.*—In describing the various sets of mechanism which operate upon the cartons successively in their course through the machine, the first to be described is the mechanism by which the filled cartons are fed to the machine. The feeding mechanism is illustrated in Figs. 1, 2, 4, 8, 10 and 11, and particular reference will be had to these figures in describing this portion of the machine. G is a conveyer belt upon which the filled cartons are placed. In practice this belt runs substantially the length of the filling room, so that the girls, or other employees, who fill the cartons, can place them upon the belt at will. The cartons thus placed in position will be fed forward by the belt, each one finally coming to rest in the position shown in dotted lines at the left hand end of the belt in Fig. 8. Whenever a carton is in this position, it will engage a stop $G^1$ carried by the upper end of a bell crank lever $G^2$, supported by the frame-work of the machine, and will rotate said bell crank lever to force the lower free end thereof downward. The lower free end of this bell crank lever is connected by a link $G^3$, with an arm $G^4$, upon a short transversely extending rock shaft $G^5$, which shaft carries a projecting arm $G^6$, lying beneath and adapted to engage with a hook $G^7$, pivoted to an intermittently reciprocable slide $G^8$. Just in advance of the position at which the cartons come to rest in their passage along the feed belt G, is mounted a feeder $g$, adapted to reciprocate across the path of the cartons to force them off the feed belt and into the path of the carton carriers already described. This feeder, $g$, is suitably guided to permit its reciprocation and it has connection, through two levers $g^1$, (Fig. 11), which are pivoted at the lower end to the frame of the machine, with the intermittently reciprocable slide G⁸ already explained, said levers g¹ passing through slots in said slide and being pivotally secured thereto. Directly in line with the intermittently reciprocable slide G⁸ is a constantly reciprocating slide g², connected by a link g³, with one end of a walking beam lever g⁴, the opposite end of said lever carrying an anti-friction roller g⁵, running in a cam slot upon a cam wheel g⁶, (Fig. 10), mounted upon and rotated by the vertical shaft A⁴, (Fig. 9). It will be seen that as the shaft A⁴ is rotated, the walking beam lever G⁴ will be rocked upon its pivot, the side g² being thus constantly reciprocated longitudinally, transversely of the machine. It will also be seen that when a carton is at the end of its movement along the feed belt, and bears against the stop G¹, it will move said stop backward, forcing the link G³ downward and rotating the shaft G⁵ with the result that the arm G⁶ will be raised and the hook G⁷ will be thrown into engagement with a suitable projection or shoulder upon the continuously reciprocating slide G², whereby the slide G⁸ will be coupled thereto so as to move therewith. As a result the lever g¹ will be reciprocated and the feeder g will be moved back and forth transversely across the feed belt G, to force the cartons from said belt into position to be grasped by the carton holders or carriers already set forth.

It will be understood that the cam, g⁶, is so arranged and is so timed in its movement, that when a carton is in position to be operated upon and operative connection is set up between the two slides, the reciprocation of the feeder will take place at such times as to feed cartons into the carton holders adapted to receive filled cartons. In other words, the feeder will make three reciprocations for each complete rotation of the wheel, C, and these reciprocations will be timed so that cartons will enter the holders or carriers, B², as they pass the feeder.

*Rear flap folder.*—As already set forth in the general description of the operation of the machine, the first operation to be performed upon the cartons after they are fed into the machine, is the folding of the rear flaps. The mechanism by which this fold is made, is illustrated in its general relations in Figs. 3 and 4, and is shown in detail in Figs. 14, 15 and 16. The shaft, D¹, which carries the wheel, D, at the right hand end of the machine, carries above said wheel a cam wheel, H. Fast upon the shaft, D¹, and consequently stationary, is a projecting bracket, H¹, just above the cam wheel, H. Pivoted to the end of the bracket, H¹, is a lever, H², carrying an anti-friction roller, H³, running in the groove of the cam wheel, H. The lever, H², is connected by means of a link, H⁴, with an arm, H⁵, projecting from a rocking sleeve, H⁶, rotatably mounted upon the shaft, D¹. The sleeve, H⁶, carries an upwardly and outwardly extending arm, H⁷, at the upper end of which is a radial journal, H⁸, in which is journaled a shaft, H⁹, to the outer end of which is secured a sheet metal folder, H¹⁰; the folder, H¹⁰, having comparatively long web, in general radially disposed with respect to the center of the shaft, H⁹, and a backwardly turned portion, h¹, which is adapted to contact with the flaps of the cartons, the corners of this portion being cut off, as shown in Fig. 15, so as to permit its ready entrance between the side flaps of the carton. The shaft, H⁹, carries a pinion, h², in mesh with a rack, h³, mounted upon the upper end of a vertically movable rod, h⁴, which is guided in suitable projecting arms provided for the purpose, on the sleeve, H⁶, and the arm, H⁷, thereof, and which is normally held in its lower position by means of a spring, h⁵. The lower end of the hod, h⁴, carries a roller, h⁶, bearing upon a cam track, h⁷, carried by arms, h⁸, mounted upon a collar, h⁹, rigidly secured to the stationary shaft, D¹, above the sleeve H⁶. This cam track, h⁷, has the form of the arc of a circle when viewed in plan, and it inclines upward from one end to the other, in the direction followed by the cartons in their movement.

It will be obvious from the foregoing description that as the wheel, D, is rotated by means of the conveyer chain, the cam wheel, H, which is secured to said wheel, will also be rotated. This movement of the cam wheel will cause the roller, H³, and the lever, H², to move radially with respect to the shaft, D¹, and such radial movement will cause angular movement of the lever about its pivot upon the bracket, H¹. This angular movement will be communicated through the link, H⁴, and the arm, H⁵, to the sleeve, H⁶, giving to sleeve, H⁶, a reciprocatory rotary motion about the shaft, D¹. The cam slot in the wheel, H, is so arranged that whenever a carton is passing around the wheel, D, the journal, H⁸, at the end of the arm, H⁷, will be moved in the same direction that the carton is moving during a portion of its movement, and during such portion of the movement will lie substantially over the carton and move at substantially the same speed therewith. After completing the necessary forward swing with the cartons, the sleeve will be quickly returned to position and will again move forward with the next carton. The relative position of the sleeve with reference to the carton can be seen in Fig. 4. It will be seen also that as the sleeve is swung forward following the carton in its movement, the reciprocating bar or rod, h⁴, will be forced up by engagement with the cam track, h⁷, and that such movement of the rod, through the medium of the pinoin, $h^2$, and rack, $h^3$, will rotate the folder, $H^{10}$ so as to bring it down upon the carton. The portion, $h^1$, of the folder, will inclose with the rear flap of each carton as it passes, holding it down upon the block or the contents of the carton, as the case may be. Upon the backward swing of the sleeve, $H^6$, the spring, $h^5$, will force downward the bar, $h^4$, causing the folder, $H^{10}$ to return to its original position, from whence it can descend to act upon the rear flap of the next succeeding carton.

*Front flap folder.*—Immediately after the folding of the rear flap and before the folder $H^{10}$, has returned to its position, the front flap of the carton engages a stationary folder, I, which bends down the front flap of the carton upon the rear flap. Shortly thereafter the side flaps of the carton are engaged by stationary guides $I^1$, which turn them outward laterally into position for further operations.

*Gluing mechanism.*—After the packages have been operated upon by the devices which fold the front and rear flaps thereof, the next operation is the application of the glue to one of the side flaps. In my present machine the glue is applied to the side flap which lies on the outside of the circuit which the cartons make. The gluing mechanism is illustrated in Figs. 17, 18 and 19, and reference to these figures will be had in describing the gluing apparatus.

It will be understood that the gluing device is located in such position as to act upon the cartons at the time when the carton holders are guided by means of the guide, $F^4$, (Fig. 8).

J (Fig. 17), indicates a glue pot in which the glue is maintained in a liquid condition by any desired apparatus. A lower glue wheel, $J^1$, mounted upon a shaft, $j$, journaled upon the frame of the glue pot, dips into the glue contained in the glue pot, so that its surface is continually kept covered with a thin layer of glue. The shaft, $j$, is driven by means of a pinion, $j^1$, which meshes with a pinion, $j^2$, on the upper end of the glue wheel driving shaft, $A^2$, which has already been described. Above the lower glue wheel, $J^1$, is an upper glue wheel, $J^2$, mounted upon the end of a shaft, $j^3$, driven by a pinion, $j^4$, which meshes with a pinion, $j^5$, upon the shaft $j$. The shaft, $j^3$, is carried by the end of a swinging arm, $j^6$, pivotally mounted upon a bracket, $j^7$, (Figs. 18 and 19), said bracket, $j^7$, being mounted upon the frame of the glue pot. This construction is such that the upper glue wheel, $J^2$, has a limited movement at right angles to its length and is normally held by its own weight in contact with the lower glue wheel, $J^1$, so that its surface is constantly kept covered with glue by contact with said lower glue wheel. When the cartons reach the vicinity of the glue wheels, the outer side flaps thereof, which are the first side flaps to be folded, are directed between said glue wheels, $J^1$ and $J^2$, and a thin layer of glue is applied to both surfaces of each of the said flaps. The movable journal of the shaft, $j^3$, upon which the upper glue wheel, $J^2$, is carried, makes it possible for the outer or first side flap to raise the upper glue wheel for its passage and the weight of the upper glue wheel maintains a firm contact between said flap and the two glue wheels, whereby the even and perfect distribution of the glue is assured.

*First side flap folder.*—After the glue is applied to the first side flap, this flap is folded by mechanism which is illustrated in Figs. 20, 21, 22 and 23. Fast upon a sleeve integral with the wheel, E, is mounted a bracket ring, K, which ring carries three radially projecting brackets, $k$, 120° apart, one of said brackets being arranged directly above each of the spokes in the wheel, E, so that one of said brackets projects radially toward the three possible positions which a carton holder can occupy in making its partial circuit of said wheel. Journaled in each of the brackets, $k$, is a bell crank lever, $K^1$, each comprising an upwardly projecting arm, $k^1$, and an inwardly extending shorter arm, $k^2$, to the inner end of which is attached a spring, $k^3$, the lower end of which is fast to the corresponding spoke in the wheel, E, whereby each of the bell crank levers is normally held in the position indicated by solid lines in Fig. 21. A cam, $K^2$, is stationarily mounted upon the shaft, $E^1$, and each of the arms, $k^1$, of the bell crank levers, $K^1$, is provided with an anti-friction roller, $k^4$, engaging with said cam. The cam, $K^2$, is so arranged that just after the carton commences its partial circuit of the periphery of the wheel, E, the corresponding bell crank lever, $K^1$, will be swung forward from the position shown in solid lines, to the position shown in dotted lines in Fig. 21, said bell crank lever reaching its forward position at about the center of the partial circuit of the carton about the periphery of the wheel, E, and being then returned to its rearmost position by the spring, $k^3$, as permitted by the cam, $K^2$, the bell crank lever reaching its inner radial position just as the carton completes its partial traverse of the periphery of the wheel, E. Thus each of the bell crank levers follows a carton in its partial traverse of the wheel, E, moving at the same angular speed therewith, and during the partial traverse of the carton the upper end of the bell crank is swung first toward and then away from the carton, as illustrated. The upper end of each of the bell crank levers, $K^1$, carries a flap folder, $K^3$, each of which comprises a bracket, $k^5$, fast on the upper end of said lever, a transversely extending shaft, $k^6$, carried by said bracket, and a series of thin disks, $k^7$, mounted upon said shaft and adapted to engage with the first side flap of the carton to be operated upon. It is to be noted that these disks engage with a surface to which glue has already been applied, and for this reason I construct the folder of the form herein shown, so that as small a surface as possible is afforded for contact with the glued surface, and this surface is widely distributed so that an even pressure is maintained upon said flap, without removing an undue amount of glue therefrom. It will be seen that each time one of the bell crank levers is swung outward radially, as heretofore described, the corresponding flap holder will engage with the flap of the carton, assuming that the carton is in the proper carton holder, and will fold said flap from the position shown in solid lines in Fig. 21, to the position shown in dotted lines in said figure and also illustrated in Fig. 20. Just below each of the flap folders upon the upper end of the bell crank levers, $K^1$, is mounted a former, $K^4$, right angled in cross-section and so positioned that when the bell crank lever is swung outward radially as illustrated the former will take the position shown in Fig. 20, so as to true up the fold made by the folder, and square the corner of the carton into a true and perfect form.

*Second side flap folder.*—After the first side flap is folded down by the means above described, the second side flap is folded into position upon it by mechanism which is illustrated in Figs. 20, 24, 25, 26 and 37, the general relation between this apparatus and the remainder of the machine being illustrated clearly in Figs. 3 and 1. There is provided above the main conveyer sprocket, C, a framework which will hereafter be described in detail, and from this framework extends a bracket, L, (Figs. 24 and 3), the end of this bracket being situated directly above the end of the shaft, $E^1$. Pivotally mounted at the outer end of the bracket, L, is a swinging cross-head, $L^2$, comprising two horizontal, parallel tubular guideways, $l$, a vertical barrel, $l^1$, which serves as a pivotal center of the cross-head, and a radially projecting arm, $l^2$. Through the parallel guides, $l, l$, extend two longitudinally movable rods, $L^3$, to the end of which is secured the second side flap folder, $L^4$. This second side flap folder, $L^4$, comprises a portion, $l^3$, adapted to be secured to the rods, $L^3$, a downwardly and outwardly projecting arm, $l^4$, and a folder plate, $l^5$, carried at the lower end of said arm, $l^4$, at a suitable level to engage with the second side flap of a carton. The folder plate, $l^5$, has its inner end turned upward as illustrated in Fig. 26, so as to engage with the second side flap of the carton just above the score mark, to bend it inward in the proper direction.

Projecting from the bracket, L, is a portion, $L^6$, (Fig. 24), from which a link, $L^7$, extends to the portion, $l^3$, of the second side flap folder, $L^4$. It will be evident that if the swinging cross-head, $L^2$, be rotated from the position shown in solid lines, (Fig. 24), to the position shown in dotted lines in said figure, the angular position of the parallel rods, $L^3$, will necessarily be varied to the same extent, and the second side flap folder, $L^4$, will be swung about the pivot of the cross-head, $L^2$. During such movement the link, $L^7$, will be swung from the position shown in solid lines in Fig. 24, to the position shown in dotted lines in said figure, and will draw the second side flap folder, $L^4$, toward the center of rotation of the cross-head, $L^2$, the rods, $L^3$, sliding through the guides and the cross-head, $L^2$, so that the parts take the position shown in dotted lines in Fig. 24. In other words the rotation of the cross-head causes the second side flap folder to move in a general rotary direction with respect to the center of oscillation of the cross-head and simultaneously to move inward radially with respect thereto.

It is evident that if a carton is in position to be operated upon, and is traveling at the same angular speed with the angular speed of the second side flap folder, the folder will operate to swing into proper position the second side flap of the carton without any relative longitudinal movement with respect to the carton, the only movement of the folder being a movement transverse to the carton and in a direct right angle to the fold to be produced.

The regular angular oscillation of the cross-head, $L^2$, to produce proper operation of the second side flap folder as the cartons pass through the machine, is produced by means of a cam, $L^8$, mounted upon and rotating with the constantly rotating shaft, $A^4$. In that portion of the framework of the machine above the main conveyer sprocket, C, is mounted a vertical rock-shaft, $l^6$, (Figs. 24 and 37), to the lower end of which is secured an arm, $l^7$, and to the upper end of which is secured an arm, $l^8$. To the end of the arm, $l^7$, which lies beneath the cam, $L^8$, is secured a roller, $l^9$, adapted to engage with the operative surfaces of said cam. These surfaces are indicated respectively by $l^{10}$, and $l^{11}$, the surfaces, $l^{10}$, being adapted to force the roller, $l^9$, when in engagement therewith, outward with respect to the center of rotation of the cam, $L^8$, and the surfaces $l^{11}$, being adapted to force said roller inward with respect to the center of rotation of the cam, when they are in engagement with said roller.

To the upper end of the shaft, $l^6$, is secured an arm $l^8$, the free end of which is connected by a link, $l^{13}$, with an arm, $l^{14}$, integral with and projecting from the center of oscillation of the cross-head. The cam surfaces upon the cam, $L^8$, are so spaced that immediately after the first side flap of any given carton has been folded down, and just as the first side flap folded begins to retreat, the cross-head will begin to rotate clockwise, as shown in Fig. 24, thus swinging the folder plate, $l^5$, about the center of the cross-head, and at the same time drawing it inward, so that said second flap is folded. In other words, the first side flap folder swings forward and completes its work and as it is retreating the second side flap folder advances, so that the second flap is partially folded down before the first side flap is released by the first side flap folder, so that if for any reason the glue was not sufficient to hold the first side flap down, it would be immediately covered and held in place by the second side flap without any possibility of springing up and being bent backward or being in any improper position when the second side flap reached its place.

*Forming and pressing means.*—Immediately after the second side flap is folded down, the carton reaches a rotary former, M, made in the form of a roller inclined at an angle of about 45 degrees to the vertical, the periphery of the roller being cut into a groove, the angle of the bottom of which is substantially 90 degrees. This roller is so positioned that as the carton moves onward its upper lateral edge will run into the groove of the former and will thereby be squared and given a proper and even shape. The former, therefore, has the effect of squaring up the upper lateral edge of the carton and making a perfectly even and true right angled fold along the score mark. This rotary former and the moving former carried by the first side flap folding mechanism, together operate to give the carton operated upon an excellent contour, so that the work of the machine ranks high in appearance.

At approximately the same time that the upper lateral edge of the carton comes in contact with the rotary former, M, the flaps issue from beneath the second side flap folding plate, $l^5$, and in order to prevent any possibility of the flap swinging up, by reason of its own elasticity or otherwise, a holding plate, N, is provided, beneath which the tops of the cartons pass. This plate exerts practically no pressure upon the carton, but merely serves to prevent the flaps from springing up during the short interval between the time when they leave the second side flap folding plate, $l^5$, and when they are taken up by the next succeeding mechanism. It will be understood that this portion of their travel occurs before the glue is firmly set, and that some such holding mechanism is desirable, although it may not in all cases be absolutely necessary.

Above the main conveyer sprocket, C, upon the upper end of the shaft, $A^4$, is mounted a plate, O, the shaft being rotatable within a central perforation in the plate, and the plate being normally stationary. About approximately 220 degrees of the periphery of said plate are pivoted a plurality of weighted arms, $O^1$, the arms being 14 in number in the device herein illustrated, although, of course their number can be varied if desired. Each of the arms is yoke-shaped in form, with its convex side upward, and each serves as the bearing for a shaft, $O^2$, carrying a frusto-conical pressure roller, $O^3$. The outer ends of the arms, $O^1$, rest in between ears, $o$, projecting upward from a segment, $o^1$, supported above and outside of the path of the cartons about the main conveyer sprocket. These ears thus form sockets, in which the outer ends of the arms rest, so that the arms are capable of a limited rotary movement about their pivots, but are prevented from angular movement with respect to the plate. Each of the shafts, $O^2$, carries upon its inner end a pinion, $O^4$, said pinions, $O^4$, meshing with the gear $O^5$, mounted upon and carried by the cam wheel, $L^8$. The gears are so proportioned that the rotation of the cam wheel, $L^8$, will revolve the shafts, $O^2$, with such speed that the peripheral velocity of the frusto-conical rollers, will be equal to the velocity of the corresponding portion of the carton moving thereunder, so that immediately after the cartons pass from under the holder plate already described, they will pass under the first roller, being pressed upon by the weight of the roller and the arm carrying the same, the glued flaps being firmly pressed together thereby, and the rollers will be positively revolved, so as not to slide upon the carton in any way and so as not to have any tendency to twist the flap or distort the package. The carton will pass from one roller to the other until it has passed all of them, by which time the glue will have set, and after issuing from the last roller, the closure of the particular set of flaps being operated upon will be complete. After issuing from beneath the last roller, the cartons have returned substantially to their starting point, having merely to traverse the straight stretch between the two extreme conveyer sprockets. Immediately after issuing from the last roller, the filled cartons, which are contained in the filled carton holders, are operated upon by the ejecting mechanism already described, and forced from the machine, while the empty cartons upon the blocks, whose bottoms have been folded pass by the stationary portion of ejecting mechanism, and the ejection trough, and are removed from position upon the blocks by an attendant, other cartons being placed in position ready for another operation.

*Adjustment.*—I have now set forth the various mechanical devices which operate successively upon the cartons, to convey them through the machine and to perform the various folding and gluing operations upon the various flaps. I have already explained, however, that my device is made adjustable to accommodate cartons of various sizes, and I have purposely neglected the description of any of the adjusting means, preferring to describe the various capacities of the machine for adjustment together, after the mechanism has been described in detail and its construction made perfectly apparent.

Cartons may differ in all three dimensions, and it is obvious to make a machine suitable for use with cartons varying in length from front to back, in width and in height, without entirely reorganizing the machine, will require adjustment in a good many portions of the structure. Carton machines have heretofore been made very largely to order, and each has been particularly designed for a single size of carton. In adjusting my machine certain parts are bodily changed for other parts adapted to fit cartons of a different size, and other parts are made adjustable, so that when an order is received for a machine to fit cartons of an odd size, only a very few parts have to be specifically made, the main portions of the machine being capable of manufacture in large quantities and in stock sizes. Furthermore, when the user desires to operate upon cartons of various sizes he can purchase a comparatively small number of interchangeable parts to replace other parts in my machine, and by making a very few simple adjustments, he can do the work upon the carton of the new size. I will add that the machine as herein illustrated, except in certain particular figures specially pointed out in the description of the drawing, is shown as adapted to receive cartons of the minimum size, and all the adjustments possible in the machine as illustrated in the bulk of the figures are adjustments in the direction of accommodating larger cartons.

Cartons passing along the feed belt, G, are held in proper vertical position during the last portion of their movement, by means of a guide plate, $G^9$, (Fig. 5), and it is obvious that when cartons of different widths are used, this guide plate must be adjusted. When I desire to operate upon wider cartons than those shown in Fig. 5, I remove the guide plate, $G^9$, and in its place I substitute a second plate of the construction shown in Figs. 12 and 13, and indicated in said figures by the characters $G^{9a}$, the relative forms of the guide plates, $G^9$, $G^{9a}$, being clearly indicated in said figures where the guide plates, $G^9$, are indicated in dotted lines.

Inasmuch as it would be a matter of considerable inconvenience to adjust the vertical height of all the various sets of mechanism which operate upon the tops of the cartons, vertically for cartons of different heights, I prefer to raise the cartons themselves bodily, so that their upper ends, upon which the mechanisms necessarily operate shall always be in the same vertical position. In order to introduce the carton, which may be of greater or less vertical height into the machine, so that their tops will be in the same vertical plane, the first adjustment necessary is one of the end of the feed belt, G, from which the cartons are moved into the machine. A plate, $G^{10}$, (Figs. 2 and 13), lies beneath this feed belt, G, and this plate carries the pulley over which the end of the feed belt runs. This plate, $G^{10}$, may be adjusted vertically by means of screws, $G^{11}$, running in slots provided to receive them, in brackets supported by the frame of the machine. The plate, $G^{10}$, is shown in its raised position in most of the figures, and its raised position is illustrated by dotted lines in Fig. 13, its lower position being indicated by solid lines in said figure. It will be obvious that by raising this plate the delivery end of the feed belt will be raised to bring the tops of the cartons into any desired vertical position, and that the pulley over which the belt runs will be simultaneously and equally raised.

In order to insure the proper working of the various mechanisms which operate upon the flaps of the cartons, it is desirable that whatever be the length of the carton from front to rear, it shall always present its center to a given point upon the operating mechanism at any given time, so that when a longer carton is used it will be symmetrically presented to the operating devices, just as a small one is, the additional length of the carton being distributed on the two sides of the center of a smaller one. In order to procure this result without entirely changing the timing of the feeding mechanism, it is desirable that the feeding mechanism be so arranged that the cartons will always be set into the machine with their longitudinal centers in the same position. To secure this result, it is necessary that a short carton be arrested in its movement along the feed belt earlier than a long one is, and to secure this result I mount the plate, $G^a$, upon rods, $G^{12}$, which can be adjusted longitudinally in suitable bearings, $G^{13}$, carried by a guide plate, $G^{14}$, stationarily secured to the same brackets which support the plate, $G^{10}$. This plate, $G^a$, is shown in a position adapted to receive small cartons of the size shown in above figures, in dotted lines in Fig. 12 and it is shown moved back to receive larger cartons in solid lines in the same figure. When the plate, $G^a$, is moved in this way, a link, $G^3$, is swung only through a very short arc and the operation of the mechanism for connecting and disconnecting the feeding plunger is not interfered with in the slightest degree.

It will be evident from the foregoing description that the feed chute and all of the feeding mechanism can be changed by the very simple means set forth, so as to feed cartons varying to a considerable extent in width, length and height, in such a way that the centers of the cartons from front to back will enter the machine in the same position at all times; that the tops of the cartons will always occupy the same vertical position, and that the side of the cartons which will be outside in its circuit around the machine, will be forced into the same absolute position, regardless of the width of the carton. This last feature is extremely desirable, because it makes it possible to dispense with any adjustment of the gluing wheel and of the first side flap folder, both of which are of such construction as to make any degree of adjustment a matter of considerable difficulty.

In order to adapt the machine to receive cartons of various sizes, I make the blocks and holders for the cartons interchangeable with others suitably formed to engage with the chain conveyer, but having upper portions suitable for coöperating with cartons of different sizes. A small holder, suitable for use with cartons such as are shown in most of the figures of the drawing, is shown in dotted lines in Figs. 12 and 13, while a larger holder is illustrated in the solid lines in the same figures. A block of the standard size is shown in Fig. 20, while a larger block is shown in Fig. 21, and from these drawings it will be readily understood how the construction of these blocks and holders is varied. It will be seen that the blocks and holders are in all cases arranged so that the tops of the cartons occupy the same vertical position and so that the side of the cartons which is the outside during their circuit through the machine, also occupies the same absolute position at all points, the excess of width being all upon one side. It will also be understood that the blocks and holders are so formed that the centers of the cartons will always lie in the same position relative to the corresponding parts of the conveyer, so that at any given point in the cycle of operation on the machine, or any of the mechanisms thereof, as for instance the first side flap folder, the center of the carton will be presented to the same portion of the operating device.

It will be apparent from the position in which different kinds of cartons are carried, that it will be unnecessary to modify or adjust the front flap folder, the rear flap folder, or the gluing wheel. The engaging portion of the front and rear flap folders are made of such form as to pass between the flaps of the small cartons, and when a larger carton is used they merely strike the center of the corresponding flaps, performing their operations in exactly the same way as when the smaller carton is used.

When larger cartons are used than those illustrated in position in the bulk of the figures, it is desirable to adjust the first side flap folder, so that in all cases it will advance well beyond the longitudinal center of the cartons, so as to insure proper contact between the first side flap and the flap beneath. To permit this adjustment to be made, each of the brackets, $k^5$, is made adjustable upon the upper end of the arm, $k^1$, of the bell crank lever, $K^1$, so that when small cartons are used the bracket is placed in the position shown in Fig. 20, while when larger cartons are used the bracket is moved forward to the position shown in Fig. 21. Thus, when the bell crank levers are swung forward, with a carton of any size, pressure is applied to the first side flap, to the same relative position upon them, this position being slightly beyond the center of the flaps operated upon. Were this adjustment not made, the engaging disks of the side flap folder would either move too far forward on a small carton, or would not move far enough forward on a large carton. For the purpose of insuring the complete retraction of the first side flap folder from above the carton, regardless of the position in which the bracket may be, the cam, $K^2$, which operates the bell crank, $K^1$, is made adjustable in height and when large cartons are being operated upon, the cam is set lower down upon the shaft, $E^1$. The result of this adjustment is that the bell crank levers are all swung forward to the same absolute position, regardless of the vertical position of the cam, because the projection upon the cam which forces the bell cranks forward, is made with a vertical face, but when the cam is in its lower position the bell cranks swing farther back, as illustrated in Fig. 21, by reason of the fact that the circular portion of the cam, $K^2$, is made with a beveled face. By these two very simple adjustments I am enabled to terminate the effective forward action of the first side flap folder at any desired point, and also to vary its backward swing considerably, so as to insure complete clearance of the carton by the folder when retracted.

The operating devices heretofore described, in connection with the capacities for adjustment, i. e., the front and rear flap folders, the gluing wheel and the first side flap folder all work either in line with the transverse center of the carton or along the outer edge thereof, and as these points are not subject to very great variation, the adjustments are comparatively simple. Furthermore, the fact that the outer lateral face of the carton always occupies the same position with reference to the operating devices, permits them to do their work in the main without any adjustment at all; for instance, the formers, $K^4$, operating upon the first side-flap, require absolutely no adjustment and will do their work satisfactorily and effectively upon any carton of any size. However, the second side flap folder, operating as it does upon the inner lateral edge of the carton, the position of which varies with different sizes of cartons, requires a wholly different type of adjustment, for it must be so adjusted as to start its movement in a different position and to terminate it in substantially the same position as if a different size of carton were used, while the first side flap folder must start in a different position and end in the same position for all cartons. This capacity for adjustment is given to the second side flap folder by mounting the end of the link, $L^7$, (Fig. 24), in a slot provided in the portion, $L^6$, of the bracket, L, which carries a rotatable cross-head, $L^2$. When a small carton is used, the end of the link is pivoted in the position shown in Fig. 24, and its initial and final positions in operation are shown in said figure. When a larger carton is used, the pivotal end of the link upon the portion, $L^6$, is moved along the slot of said portion until the folder plate, $l^5$, occupies the same relative position with respect to the edge of the larger carton, as it does with reference to the edge of the smaller carton illustrated in Fig. 24. The slot is so shaped that as the cross-head rotates and the folder plate is swung sidewise in the arc of the circle, it will move inward substantially the same distance in all cases, its swing being slightly greater of course with a large carton than with a small one, so that the folder plate in all cases advances over about one-half the top surface of the carton. The rotating former, M, (Fig. 24), is also made adjustable, necessarily, to engage with the inner edge of various size cartons, the adjustment being effective by making a bracket, $M^1$, adjustable upon the portion of the framework which supports it by means of a screw mounted in the frame-work and running in a slot cut in said bracket.

It is obvious of course that the folder plate, N, and the weighted rollers, $O^3$, will require no adjustment whatever, for they are made of sufficient size to engage with cartons of any width, and for mere pressure purposes a device which will engage with a wide carton will operate perfectly on a single one.

Referring again to Figs. 12 and 13, it will be evident that when a large holder is substituted for a small one, the proportions of all the parts will be changed, and particularly the position of the side of the holder which is innermost in its circuit of the machine. This results in a difference in position of the rollers, $b^{12}$, carried at the pivots of the links, $b^9$, $b^{10}$, which operate the holding fingers, $b^7$, the rollers occupying different positions both when in their inner and outer positions, for all sizes of cartons. This difference in position of the rollers makes it necessary to provide means by which the cam track, $F^2$, can be moved forward or back laterally upon the machine, to coöperate with rollers in all the possible varying positions. By referring to Figs. 34 and 35 it will be seen that this cam track is carried by a vertically extending bracket secured to the frame of the machine, said bracket being held in place by screws running in slots provided upon the frame. By this construction it is possible to shift the position of the track transversely in the machine, so that it will engage the rollers with and operate the holding fingers of the carton carriers regardless of the size of said carriers or the positions which the rollers thereon may occupy.

From the foregoing description of the capacities for adjustment of my improved machine, it will be seen that it can be made to accommodate cartons of any desired size, by the simple change of one set of holders and blocks for another, by the addition of one other part for another, and by making six very simple adjustments. It will be observed also that any one of the adjustments can be made with the greatest ease by putting one of the desired carton carriers in place upon the conveyer and passing it through the machine, stopping it for purposes of adjustment opposite the various devices whose position must be shifted. Furthermore, in manufacturing my improved machine, one stock pattern can be made and only the blocks, carriers and one other part need be made to fit the stock machine, for working upon cartons of any size, however irregular.

*Modification in side folders.*—In the modified form of first side flap folder illustrated in Figs. 38-43 inclusive, I remove the shaft $k^6$ carrying the disk $k^7$ from the bracket $k^5$ at the upper end of the bell-crank levers $K^1$, and pivot in each bracket a folding member P, each of which has a series of parallel fingers $p$, triangular in cross-section with their sharp edges downward as illustrated. Each of the folding members P projects backward beneath the bracket $k^5$ to which it is secured, so that the downward swing of its forward edge and of the forwardly projecting fingers is limited. Each of the folding members has pivoted on its lower base on a vertical pivot a truing-bar $p^1$, whose motion is limited by lugs $p^2$. The folding member is so weighted that it normally occupies the position shown in Fig. 43, or the position shown in dotted lines in Fig. 38. As it swings forward toward the cartons, the truing-bar $p^1$ engages the cartons, swinging the rear edge of the folding member upward and backward to the position shown in the solid lines in Fig. 38, so that a true folding action is performed upon the side flaps, the folding member rotating in the same general direction as the flaps. The truing-bar $p^1$ of each folder eventually comes to rest against the upper corner of the carton and the fact that this bar is pivoted causes it to accommodate itself readily to any possible variation in the angular position of the cartons operated upon. I consider this form of folder in certain respects preferable to the one already described. In the first place the member which actually engages with the carton flaps swings in the same general direction as the said flaps, so that there is no sliding or rolling action thereon. Furthermore, the fingers swing up out of the path of the next descending side flap, so that there is no necessity for adjusting the throw or the folder for different size cartons, although such adjustment may be desirable. The pivoted truing-bar evidently performs the same function as the angular former of the construction already described.

The second side flap folder illustrated in Figs. 44, 45, 46 and 47 has the same cross-head, the same operating parts therefor, the same guide-rods, and it has at its end a portion $l^5$ exactly similar to that portion of the folder $l^3$ attached to the guide-rod of the form of folder already described. The link $L^7$, however, is omitted, and in its place a link Q is substituted, the said link Q running to the opposite side of the pivot of the cross-head, so that if the cross-head is rotated the rods and connecting member $l^3$ at the end thereof move outward radially instead of inward radially. The portion $l^3$ is provided with a transverse perforation, through which runs a pintle affording pivotal support for a curved arm $Q^1$ extending outward as illustrated in Fig. 46. The arm $Q^1$ carries at its end a folder-plate $Q^2$ and has adjacent to its pivot a projecting ear $q$ connected by a link $q^1$ with the cross-head barrel $l^4$. It will be obvious that as the rods move outward radially, the arm $Q^1$ will be swung down from the position shown in Fig. 46 to the position shown in Fig. 47, the folder-plate $Q^2$ thus folding down the second side flap to the carton with a downward-turning movement and without any sliding thereon of any kind. I consider this form of construction preferable to the one heretofore described for the reason that there is no such sliding movement as will mar the finish of the flaps.

I claim as new and desire to secure by Letters Patent:

1. The combination with a continuously movable carton carrier of a movable rear flap folder adapted to operate upon the cartons carried by different portions of said carton carrier and means for imparting to the operating portion of said folder, a compound movement having two components, one a movement at the same speed with and parallel to the movement of the cartons and the other a rotary movement with reference to the carrier, whereby said operative portion moves down and forward at a greater speed than the cartons to be operated upon.

2. The combination with a carton carrier adapted to move the cartons continuously while their rear flaps are being operated upon, a rear-flap-folder carrier, and means for moving said rear-flap-folder carrier during a portion of its movement parallel with the course of the carton, of a rear flap folder carried by said rear flap folder carrier and means for moving said rear flap folder with reference to its carrier to bring it into engagement with the rear flaps of the cartons carried by different parts of the carton carrier.

3. The combination with a carton carrier adapted to move the cartons continuously while their rear flaps are being operated upon, a rear-flap-folder carrier, and means for moving said rear flap folder during a portion of its movement parallel with the course of the cartons, of a rear flap folder carried by said rear flap folder carrier, and means for moving said rear flap folder with reference to its carrier and in a direction forward with respect to the movement of each carton carrier.

4. The combination with a carton carrier adapted to move the cartons continuously while their rear flaps are being operated upon, a rear-flap-folder carrier, and means for moving said rear flap folder carrier during a portion of its movement parallel with and in substantially the same speed as the movement of the cartons of a rear flap folder carried by said rear flap folder carrier, and means for moving said rear flap folder with reference to its carrier to bring it into engagement with the rear flaps of cartons carried by different portions of the carton carrier.

5. The combination with a carton carrier adapted to move the cartons continuously while their rear flaps are being operated upon, a rear flap folder carrier, and means for moving said rear flap folder carrier, during a portion of its movement, parallel with the cartons and at substantially the same speed therewith, of a rear flap folder carried by said rear flap folder carrier, and means for moving said rear flap folder forward with reference to its carrier to bring it into engagement with the rear flaps of the cartons carried by different portions of the carton carrier.

6. The combination with a carton carrier adapted to move the cartons continuously while their rear flaps are being operated upon, a rear flap folder carrier, and means for moving said rear flap folder carrier during a portion of its movement parallel with and above the course of the cartons, of a rear flap folder carried by said rear flap folder, means for moving said rear flap folder with reference to its carrier forwardly and downwardly to bring it into engagement with the rear flaps of cartons carried by different portions of the carton carrier.

7. The combination with a carton carrier adapted to move the cartons to be operated upon continuously while their rear flaps are being operated upon, a rear flap folder carrier, and means for moving said rear flap folder carrier during a portion of its movement parallel with and above the course of the cartons and at substantially the same speed therewith, a rear flap folder carried by said rear flap folder carrier, means for moving said rear flap folder with its carrier and also with reference to its carrier forwardly and downwardly, to bring it into engagement with the rear flaps of cartons carried by different portions of the carton carrier.

8. The combination with a carton carrier adapted to move cartons continuously while their rear flaps are being operated upon, a rear flap folder carrier, and means for moving said rear flap folder carrier during a portion of its movement parallel with the course of the cartons, of a rear flap folder pivotally mounted upon the rear flap folder carrier, and means for rotating said rear flap folder to swing its operative end forward and downward with reference to its carrier to bring its operative end into engagement with the rear flaps and cartons to be operated upon.

9. The combination with a carton carrier adapted to move cartons continuously while their rear flaps are being operated upon, a rear flap folder carrier, and means for moving said rear flap folder carrier during a portion of its movement parallel with the course of the cartons, of a rear flap folder pivotally mounted upon the rear flap folder carrier, and means for oscillating said rear flap folder while its carrier is moving parallel to the cartons to swing its operative end forward and downward with respect to the cartons to engage the rear flaps thereof.

10. The combination with a carton carrier adapted to move cartons continuously while their rear flaps are being operated upon, a rear flap folder carrier, and means for moving said rear flap folder carrier during a portion of its movements parallel with the course of the cartons, of a rear flap folder pivotally mounted upon the rear flap folder carrier, a stationary cam, and connections between said stationary cam and said rear flap folder, whereby said rear flap folder can be oscillated to swing its operative end forward and downward with respect to the cartons to engage the rear flaps thereof.

11. The combination with a carton carrier adapted to move the cartons continuously while their rear flaps are being operated upon, of a rear flap folder carrier, means for moving the rear flap folder carrier during a portion of its movement parallel with the course of the cartons to be operated upon, of a rear flap folder pivotally mounted in a rear flap folder, a stationary cam, a thrust rod having a bearing upon the cam, a rack on the thrust rod, and a pinion connected to the rear flap folder and engaging the rack, whereby the operative end of the rear flap folder is thrown forward and downward with respect to the cartons to engage the rear flaps thereof successively.

12. The combination with a carton carrier adapted to move the cartons continuously while their rear flaps are being operated upon, a rear flap folder carrier, and means for oscillating said rear flap folder carrier in a course substantially parallel to that of the cartons, of a rear flap folder carried by a rear folder carrier, and means for moving said rear flap folder with reference to its carrier to bring it into engagement with the rear flaps of cartons carried by different portions of the carton carrier.

13. The combination with a carton carrier adapted to move the cartons continuously while their rear flaps are being operated upon, a rear flap folder carrier, and means for oscillating said rear flap folder carrier in a path substantially parallel to that of the cartons and above the same, of a rear flap folder carried by said rear flap folder carrier, and means for moving said rear flap folder with reference to its carrier to bring it into engagement with the rear flaps of cartons carried by different portions of the carton carrier.

14. The combination with a carton carrier adapted to move cartons continuously while their rear flaps are being operated upon, a rear flap folder carrier, and means for oscillating said rear flap folder carrier in a path substantially parallel to that of the cartons, of a rear flap folder carried by said rear flap folder carrier, and means for moving said rear flap folder with reference to its carrier forward to bring it into engagement with the rear flaps of cartons carried by different portions of the carton carrier.

15. The combination with a carton carrier adapted to move cartons continuously while their rear flaps are being operated upon, a rear flap folder carrier and means for oscillating said rear flap folder carrier in a path substantially parallel to that of the cartons and above the same, of a rear flap folder carried by said rear flap folder carrier, and means for moving said rear flap folder with reference to its carrier forward and downward to bring it into engagement with the rear flaps of cartons carried by different portions of the carton carrier.

16. The combination with a carton carrier adapted to move cartons continuously while their rear flaps are being operated upon, a rear flap folder carrier, and means for oscillating said rear flap folder carrier in a path substantially parallel to that of the cartons, of a rear flap folder pivotally mounted in said rear flap folder carrier, and means for rotating said rear flap folder to swing its operative end forward into engagement with the rear flaps of cartons carried by different portions of said carton carrier.

17. The combination with a carton carrier adapted to move the cartons continuously while their rear flaps are being operated upon, a rear flap folder carrier, and means for oscillating said rear flap folder carrier in a path substantially parallel to that of the cartons and above the same, of a rear flap folder pivotally mounted in said rear flap folder carrier, and means for rotating said rear flap folder to swing its operative end forward and downward into engagement with the rear flaps of cartons carried by different portions of the carton carrier.

18. The combination with a carton carrier adapted to move cartons continuously while their rear flaps are being operated upon, a rear flap folder carrier, and means for oscillating said rear flap folder carrier in a path substantially parallel to that of the cartons and above the same, of a rear flap folder pivotally mounted upon the rear flap folder carrier and means for oscillating said rear flap folder while its carrier is moving parallel to the cartons to swing its operative end into engagement with the rear flaps of cartons carried by different portions of the carton carrier.

19. The combination with a carton carrier adapted to move cartons continuously while their rear flaps are being operated upon, a rear flap folder carrier, and means for oscillating said rear flap folder carrier in a path substantially parallel to that of the cartons and above the same, of a rear flap folder pivotally mounted in said rear flap folder carrier, a stationary cam, and connections between said cam and said rear flap folder, whereby said rear flap folder is oscillated upon its pivot to swing its operative end forward and downward into engagement with the rear flaps of cartons carried by different portions of said carton carriers.

20. The combination with a carton carrier adapted to move cartons continuously while their rear flaps are being operated upon, a rear flap folder carrier, and means for oscillating said read flap folder carrier in a path substantially parallel to that of the cartons and above the same, of a rear flap folder pivotally mounted in said rear flap folder carrier, the stationary cam, a thrust rod having a bearing upon said stationary cam, a rack mounted upon said thrust rod, a pinion carried by said rear flap holder and engaging the rack where the rear flap holder carrier is moving in the same direction as the cartons the rear flap folder will be rotated downward and forward to engage the rear flaps of cartons carried by different portions of the carton carriers.

21. The combination with a carton carrier adapted to move cartons continuously while their rear flaps are being operated upon and in an arc of a circle during such movement, a rear flap folder carrier pivotally mounted in the center of such arc, and means for imparting to said rear flap folder carrier a rotary movement about its pivot, of a rear flap folder carried by said rear flap folder carrier, and means for moving said rear flap folder with reference to its carrier to bring it into engagement with the rear flaps of cartons carried by different portions of the carton carrier.

22. The combination with a carton carrier constructed and arranged to move cartons continuously while their rear flaps are being operated upon and at such times to move them in an arc of a circle, a rear flap folder pivotally mounted at the center of such arc, and having a portion extending above the path of the cartons, and means for imparting to said rear flap folder carrier a rotary movement about its pivot of a rear flap folder carrier by said rear flap folder carrier and means for moving said rear flap folder with reference to its carrier to bring it into engagement with the rear flaps of cartons carried by different portions of said carton carrier.

23. The combination with a carton carrier constructed and arranged to move cartons continuously while their rear flaps are being operated upon and in an arc of a circle during such time, a rear flap folder pivotally mounted at the center of such arc, and means for oscillating said rear flap folder carrier about its pivot, of a rear flap folder carried by said rear flap folder carrier and means for moving said rear flap folder with reference to its carrier to bring it into engagement with the rear flaps of cartons carried by different portions of said carton carrier.

24. The combination with a carton carrier constructed and arranged to move cartons continuously while their rear flaps are being operated upon and in an arc of a circle during such movement, a rear flap folder carrier pivotally mounted at the center of such arc, and having a portion extending above the path of the cartons, means for oscillating said rear flap folder carrier above its center, of a rear flap folder carried by the portion of said rear flap folder carrier which extends above the path of the cartons, a rack, a thrust rod carrying the same, a pinion having connection with said rear flap folder carrier and engaging said rack and a cam engaging the thrust rod whereby as the rear flap folder carrier is moved in one direction the thrust rod will be operated to rotate the rear flap folder about its pivot upon the rear flap folder carrier to swing into engagement with the rear flaps of the cartons.

25. The combination with the carton carriers continuously and in an arc of a circle while the rear flaps are being operated upon, a rear flap folder carrier pivotally mounted in the center of such arc and having a portion extending above the path of the cartons, and means for imparting to said rear flap folder carrier a rotary movement about its pivot of a rear flap folder carrier carried by said rear flap folder carrier and above the path of the carton and means for moving said rear flap folder carrier with reference to its carrier to swing it forward and downward into engagement with the rear flap of a carton.

26. The combination with a carton carrier constructed and arranged to move cartons continuously and in an arc of a circle while their rear flaps are being operated upon, a rear flap folder carrier pivotally mounted in the center of said arc and having a portion extending above the path of the cartons, and means for oscillating said rear flap folder carrier about its pivot, of a rear flap folder carried by the portion of said rear flap folder carrier above the path of the carton and means for moving said rear flap folder with reference to its carrier to bring it into engagement with the rear flaps of cartons carried by different portions of the carton carrier.

27. The combination with a carton carrier adapted to move cartons continuously and in an arc of a circle while their rear flaps are being operated upon, a rear flap folder carrier pivotally mounted at the center of such arc and having a portion extending above the path of the cartons, and means for imparting to said rear flap folder carrier a rotary movement about its pivot, of a rear flap folder pivotally mounted in said rear flap folder carrier and means for rotating said rear flap folder to swing its operatives forward and downward with reference to the carrier to bring it into engagement with the rear flaps of cartons carried by different portions of said carton carrier.

28. The combination with the carton carriers adapted to move cartons continuously in an arc of a circle while their rear flaps are being operated upon, a rear flap folder carrier pivotally mounted in the center of said arc and having a portion extending above the path of the cartons, and means for imparting to said rear flap folder carrier a rotary movement about its pivot, of a rear flap folder pivotally secured to that portion of the rear flap folder carrier which extends above the path of the carton and means for oscillating said rear flap folder while its carrier is moving in the same direction with the cartons to swing its operative end into engagement with the rear flaps thereof.

29. The combination with the carton carrier adapted to move cartons continuously and in an arc of a circle while their rear flaps are being operated upon, a rear flap folder carrier pivotally mounted at the center of said arc and having a portion extending above the path of the cartons, and means for imparting to said rear flap folding carrier an oscillatory motion about its pivot and a rear flap folder pivotally mounted in that portion of the rear flap folder carrier which extends above the path of the cartons, a stationary cam and connections between said cam and said rear flap folder whereby as the rear flap folder carrier swings forward with the cartons the rear flap folder will be swung forward and downward to engage the rear flap thereof.

30. The combination with a carton carrier adapted to move cartons continuously and in an arc of a circle while their rear flaps are being operated upon, a rear flap folder carrier pivotally mounted at the center of such arc, and having a portion extending above the path of said cartons, and means for oscillating said rear flap folding carrier about its center, of a rear flap folder pivotally mounted in the portion of said rear flap folder carrier which extends above the path of the cartons, a stationary cam, a thrust rod carried by said rear flap folder carrier and provided with a bearing upon said cam, a rack on the thrust rod and a pinion connected with said rear flap folder and in engagement with said rack.

31. The combination with a carton carrier adapted to move cartons continuously and in an arc of a circle while their rear flaps are being operated upon, a rear flap folder carrier pivotally mounted at the center of such arc and having a portion extending above the path of the carton carrier, means for imparting to said rear flap folder carrier a rotary movement about its center, a rear flap folder carried by said rear flap folder carrier, and means for swinging said rear flap folder carrier forward and downward with respect to its carrier to bring it into engagement with the rear flaps of cartons carried by different portions of the carton carrier.

32. The combination with a carton carrier adapted to move cartons continuously and in an arc of a circle while their rear flaps are being operated upon, of a rear flap folder carrier pivotally mounted at the center of such arc and having a portion extending above the path of the cartons, and means for oscillating said rear flap folder carrier about its pivot, of a rear flap folder carried by said rear flap folder carrier and above the path of the cartons, and means for oscillating said rear flap folder to swing it into engagement with the rear flaps of cartons carried by different portions of said carton carrier.

33. The combination with a carton carrier adapted to move cartons continuously and in an arc of a circle while their rear flaps are being operated upon, a rear flap folder carrier pivotally mounted at the center of such arc, and means for imparting to said rear flap folder carrier a rotary movement about its center, of a rear flap folder pivoted in said rear flap folder carrier and means for rotating said rear flap folder to swing its operative portion into engagement with the rear flaps of cartons carried by different portions of said carton carrier.

34. The combination with a carton carrier constructed and arranged to move cartons continuously and in an arc of a circle while their rear flaps are being operated upon, a rear flap folder carrier pivotally mounted in the center of such arc, and means for oscillating said rear flap folder carrier about its center, of means for oscillating said rear flap folder about its pivot while its carrier is moving in the same direction as the carton to swing its operative portion into engagement with the rear flaps of cartons carried by different portions of the carton carrier.

35. The combination with a carton carrier constructed and arranged to move cartons continuously while their rear flaps are being operated upon and in an arc of a circle during such movement, a rear flap folder carrier pivotally mounted at the center of such arc, and means for imparting to said rear flap folder carrier a rotary movement about its center, of a rear flap folder pivotally mounted in said rear flap folder carrier, a stationary cam concentric with the rear flap folder carrier, and connections between said cam and said rear flap folder whereby while the rear flap folder is moving with the cartons it is swung into engagement with the rear flaps thereof.

36. The combination with a carton carrier constructed and arranged to move cartons continuously and in an arc of a circle while their rear flaps are being operated upon, a rear flap folder carrier pivotally mounted at the center of such arc, and means for oscillating said rear flap folder carrier about its center, of a rear flap folder pivotally mounted in said rear flap folder carrier, and a stationary cam concentric with said rear flap folder carrier and connections between said stationary cam and said rear flap folder whereby said rear flap folder is oscillated upon its pivot into engagement with the rear flaps of the cartons carried by successive portions of the carton carrier.

37. The combination with a carton carrier constructed and arranged to move cartons continuously and in an arc of a circle while their flaps are being operated upon, a rear flap folder carrier pivotally mounted at the center of such arc, and means for imparting to said rear flap folder carrier a rotary movement about its center, of a rear flap folder pivotally mounted upon said rear flap folder carrier, a stationary cam concentric with said rear flap folder carrier, a thrust rod having a bearing upon said cam, a rack carried by said thrust rod, a pinion connected with said rear flap folder and in engagement with said rack whereby while moving in the direction in which the cartons are moving the rear flap folder is oscillated into engagement with the rear flaps of cartons carried by different portions of the carton carrier.

38. The combination with a carton carrier constructed and arranged to move cartons continuously and in an arc of a circle while their rear flaps are being operated upon, a rear flap folder carrier pivotally mounted at the center of such arc, and means for oscillating said rear flap folder carrier about its center, of a rear flap folder pivotally mounted upon said rear flap folder carrier, a stationary cam concentric with said rear flap folder carrier, a thrust rod carried by said rear flap folder carrier, and having bearing upon said cam, a rack carried by said thrust rod, a pinion having connection with said rear flap folder carrier, and engaging said rack whereby as the rear flap folder carrier is moved in one direction the thrust rod will be operated to rotate the rear flap folder about its pivot upon the rear flap folder carrier to swing into engagement with the rear flaps of the cartons.

39. The combination with a carton carrier adapted to carry cartons continuously and in an arc of a circle while their rear flaps are being operated upon, a rear flap folder carrier pivotally mounted at the center of such arc and having a portion extending above the path of the cartons, and means for imparting to said rear flap folder carrier a rotary movement about its center, of a rear flap folder carried by said rear flap folder carrier and above the path of the carton and means for moving said rear flap folder with reference to its carrier to swing it forward and downward into engagement with the rear flap of a carton carried by the conveyer.

40. The combination with a carton carrier constructed and arranged to move cartons continuously and in an arc of a circle while their rear flaps are being operated upon, a rear flap folder carrier pivotally mounted at the center of such arc and having a portion extending above the path of the cartons, and means for oscillating said rear flap folder carrier about its center, of a rear flap folder carried by the portion of said rear flap folder carrier above the path of the carton, and means for moving said rear flap folder with reference to its carrier to bring it into engagement with the rear flaps of cartons carried by different portions of the carton carrier.

41. The combination with a carton carrier adapted to move cartons continuously and in an arc of a circle while their rear flaps are being operated upon, a rear flap folder carrier pivotally mounted at the center of such arc and having a portion extending above the path of the cartons, and means for imparting to said rear flap folder carrier a rotary movement about its center, of a rear flap folder pivotally mounted in said rear flap folder carrier and means for rotating said rear flap folder to swing its operative end forward and downward with reference to the carrier to bring it into engagement with the rear flaps of cartons carried by different portions of said carton carrier.

42. The combination with a carton carrier adapted to move cartons continuously and in an arc of a circle while their rear flaps are being operated upon, a rear flap folder carrier pivotally mounted at the center of such arc and having a portion extending above the path of the cartons, and means for imparting to said rear flap folder carrier a rotary movement about its pivot, of a rear flap folder pivotally secured to that portion of a rear flap folder carrier which extends above the path of the cartons and means for oscillating said rear flap folder while its carrier is moving in the same direction with the cartons to swing its operative end into engagement with the rear flaps thereof.

43. The combination with a carton carrier adapted to move cartons continuously and in an arc of a circle while their rear flaps are being operated upon, a rear flap folder carrier pivotally mounted at the center of such arc and having a portion extending above the path of the cartons, and means for imparting said rear flap folder carrier a rotary movement about its pivot, of a rear flap folder pivoted to the portion of said rear flap folder carrier extending above the path of the cartons, a stationary cam, and connections between said cam and said rear flap folder carrier whereby while the rear flap folder is moving with the cartons it will be rotated about its pivot into engagement with the rear flaps of said cartons.

44. The combination with a carton carrier adapted to move cartons continuously and in an arc of a circle while their rear flaps are being operated upon, a rear flap folder carrier pivotally mounted at the center of such arc and having a portion extending above the path of the cartons, and means for imparting to said rear flap folder carrier a rotary movement about its center, of a rear flap folder pivotally mounted in the portion of said rear flap folder carrier above the path of the cartons, a stationary cam, a thrust rod having a bearing upon said cam, a rack on said thrust rod and a pinion engaging said rack and connected with said rear flap folder.

45. The combination with a carton carrier adapted to move cartons continuously and in an arc of a circle while their rear flaps are being operated upon, a rear flap folder pivotally mounted at the center of such arc and having a portion extending above the path of said cartons, and means for oscillating said rear flap folder carrier about its center, of a rear flap folder pivoted in that portion of said rear flap folder which extends above the path of the cartons, and means for rotating said rear flap folder to swing its operative portion forward and downward into engagement with the rear flaps of the cartons.

46. The combination with a carton carrier adapted to move cartons continuously and in an arc of a circle during a portion of their movement, a folder carrier pivotally mounted at the center of such arc, a folder carried by said folder carrier, a rotary cam concentric with said folder carrier, an arm extending from said folder carrier radially, an oscillating arm pivoted to a stationary support eccentric with respect to said folder carrier, a link connecting said two arms, and means on said oscillating arm for engaging said cam whereby as the cam is rotated said folder carrier will be oscillated about its pivot.

47. The combination with a carton carrier adapted to move cartons during a portion of their movements in an arc of a circle, of a folder carrier pivotally mounted at the center of such arc, a rotary cam concentric with said folder carrier, a folder carried by said folder carrier and above the path of the cartons, an arm projecting radially from the folder carrier, an oscillating arm pivoted to a stationary support eccentric with respect to the folder carrier, a link connecting said two arms, and means upon the oscillating arm engaging the cam whereby the cam is rotated and the folder carrier is oscillated about its pivot.

48. The combination with a flexible carton conveyer, of guiding means for said carton conveyer arranged to carry cartons during a portion of the movement in an arc of a circle, a folder pivoted to the center of said circle and means for moving said folder angularly about its pivot with the same angular velocity as the cartons and for imparting to the folder another movement independent of its angular movement whereby the folder operates successively upon the flaps of cartons carried by different parts of said conveyer.

49. The combination with an endless flexible carton conveyer, of guiding means for directing a portion of the movement of said carton conveyer into an arc of a circle, a folder pivoted at the center of said arc, and means for moving said folder angularly about its pivot with the same angular velocity as the cartons and for imparting to the folder another movement independent of its angular movement whereby said folder operates upon the flaps of cartons carried by different parts of the conveyer.

50. The combination with a flexible carton conveyer, of guiding means for such carton conveyer arranged to carry cartons during a portion of their movement in an arc of a circle, a folder pivoted to the center of said arc, and means for oscillating said folder angularly about its pivot with the same angular velocity as the cartons and opposite the same as they pass said guiding means and for imparting to the folder a second movement independent of its angular movement whereby it operates upon the flaps of cartons carried by different parts of said conveyer.

51. The combination with an endless flexible carton conveyer, of a guiding means for directing a portion of the movement of said conveyer into the form of an arc of a circle, a folder pivoted at the center of said arc, and means for oscillating said folder angularly about its pivot with the same angular velocity as the cartons and opposite the same as they pass said guiding means, the folder being returned at the intervals between the passage of cartons, and for imparting to the folder another movement independent of its angular movement whereby it operates upon the flaps of cartons carried by different portions of the conveyer.

52. The combination with a conveyer adapted to move cartons continuously in an arc of a circle during a portion of their movement, of a folder having a pivotal support concentric with said arc, means for imparting to said folder an angular movement about its pivot of the same angular velocity as the angular velocity of the cartons carried by the conveyer and opposite the same as they move about said arc and for imparting to the folder a second movement in addition to its angular movement to bring it into engagement with the flaps of cartons carried by different portions of the conveyer.

53. The combination with a conveyer adapted to move cartons continuously in an arc of a circle during a portion of their movement, of a folder having a pivotal support concentric with said arc and means for imparting to said folder an oscillatory angular movement about its pivot at the same angular speed in one direction as the movement of the carton while passing about said arc and opposite the same at such times and for imparting to said folder a second movement in addition to its oscillatory movement to bring it into engagement with the flaps of cartons carried by said conveyer without relative longitudinal movement with respect thereto.

54. The combination with a flexible carton conveyer and guiding means for directing said conveyer into an arc of a circle during a portion of its movement, of a side flap folder rotatable about the center of said arc and positioned to lie opposite the cartons as they pass along said arc, means for moving said folder angularly in the same angular velocity as the cartons while they pass said arc and means for moving said folder while in angular movement radially outward to engage the flaps of the cartons.

55. The combination with a flexible carton conveyer and guiding means for directing cartons carried thereby into a path in the form of an arc of a circle during a portion of their movement of a plurality of side flap folders in number less than the carton holders of the conveyer, means for moving said folders angularly at the same angular velocity as the cartons move in passing about said arc, and means for moving said folders while in angular movement radially outward to engage the flaps of the cartons.

56. The combination with a flexible carton conveyer having carton holders and guiding means for directing the cartons into a path in the form of an arc of a circle during a portion of their movement of a plurality of side flap folders in number less than the number of carton holders of the conveyer and rotatable about the center of said arc and positioned opposite to various cartons as they pass said arc, means for moving said folders angularly and at the same angular velocity with the cartons as they pass about said arc and means for moving said folders while in angular movement radially outward to engage the flaps of the cartons.

57. The combination with a flexible carton conveyer having carton holders, of a wheel over which said conveyer passes and rotatable therewith, a side flap folder rotatable with said wheel and positioned so as to lie opposite the cartons as they pass about the same and means for moving said folder while in angular movement radially outward to engage the flaps of the cartons.

58. The combination with a flexible carton conveyer having carton holders, of a wheel over which said conveyer passes and which is rotatable therewith, a plurality of side flap folders in number less than the numbers of the carton holders of the conveyer rotatable with said wheel and positioned so as to lie opposite the cartons as they pass about the periphery of said wheel, and means for moving said holders while in angular movement radially outward to engage with the flaps of the cartons.

59. The combination with a flexible carton conveyer having carton holders, of a wheel over which said conveyer passes and rotatable therewith, a side flap folder rotatable with said wheel and positioned to lie opposite the position of a carton with reference to said wheel and a stationary cam adapted to engage with said folder to move it outward radially while in angular movement so as to engage with the flaps of cartons carried by different portions of the conveyer.

60. The combination with a flexible carton conveyer and a wheel over which said conveyer passes and rotatable therewith, of a plurality of side flap folders in number less than the number of the carton holders of the conveyer and rotatable with said wheel and positioned so as to lie opposite the cartons as they pass about said wheel, a stationary cam adapted to engage said side flap folder to move it outward while in angular movement to engage the side flaps of the cartons.

61. The combination with a flexible carton conveyer, and a wheel over which said conveyer passes and rotatable therewith, of a rotary spider movable at the same angular velocity with the wheel, levers pivoted to said spider, flap engaging means on said levers, and a stationary cam engaging said levers to swing said flap engaging means outward radially while in angular movement to engage the flaps of the cartons.

62. The combination with an endless continuously moving carton conveyer, of a wheel about which said conveyer passes during a portion of its movement whereby the cartons carried by said conveyer travel in a path in the form of an arc of a circle during a portion of their movement, a side flap folder revolubly mounted concentrically with the wheel, and means for imparting to the folder a movement of revolution of equal angular speed with the angular speed of the cartons as they pass about the periphery of the wheel, and means for advancing the carton folders radially outward to engage the flaps of cartons while passing said wheel.

63. The combination with a flap folder support, and means for periodically moving the same forward toward the position of the carton to be operated upon, of a flap engaging device pivoted between its ends upon said flap folder support with its forward end normally raised, and an abutment on said flap engaging device behind its pivot and in position to contact with a carton to swing the forward end of said flap engaging device downward upon a flap thereof.

64. The combination with a flap folder support and means for moving the same periodically forward toward the position of the carton, of a flap engaging device pivoted between its ends in said flap folder support with its forward end normally raised and an abutment pivotally secured to said flap engaging device behind its pivot and in position to contact with a carton to swing the forward end of said flap engaging device downward.

65. The combination with a flap folder support and means for moving the same periodically forward toward the position of a carton, and means of a flap engaging device pivoted between its ends upon said flap folder support and with its forward end normally raised, the forward end of said flap folder support being formed into a plurality of narrow fingers, and an abutment on said flap folder support behind its pivot adapted to engage with the carton to force the forward end thereof downward.

66. The combination with a flap engaging device pivoted to swing upon a horizontal pivot parallel to the fold of the flap which it is designed to engage of means upon said flap engaging device adapted to engage with a carton and constructed and arranged to swing said flap engaging device upon its pivot down upon a flap when so engaged.

67. The combination with a flap engaging device pivoted to swing upon an axis parallel to the fold of the flap with which it is to engage, of means for moving said flap engaging device bodily toward the carton to be operated upon and engaging means upon said flap engaging device adapted by contact with the carton to rotate said flap engaging device to swing down the flap engaged.

68. The combination with a carton conveyer, and means for driving the same continuously, of two side flap folders on opposite sides of the path of the cartons carried by the conveyer and independent of the conveyer, means for moving said side flap folders parallel with the direction of movement of the cartons opposite to each other and at substantially the speed of the cartons, means for advancing the first side flap folder while in such motion across the path of the carton to fold the first side flap, and means for subsequently moving the second side flap folder while in movement with the carton across its path to fold the second side flap.

69. The combination with a continuously moving carton conveyer, two side flap folders mounted upon opposite sides of the path of the carton carried by said conveyer, and means for moving said two side flap folders in paths parallel to the path of the cartons and at substantially the same speed therewith, of means for advancing the first side flap folder while in such motion transversely across the path of the carton to fold down the first side flap and means for advancing the second side flap folder while in such motion and immediately after the completion of the movement of the first side flap folder to fold down the second side flap, whereby the second side flap is folded upon the first before the first side flap folder is removed from the first side flap.

70. The combination with a carton conveyer adapted to move cartons in an arc of a circle during a portion of the movement and keep them in continuous motion during such portion of their movement, of a folder pivoted at the center of said arc, means for imparting to said folder an oscillatory movement about its center, the movement of a folder having the same angular velocity when moving in one direction as the angular velocity of the cartons passing about said arc, and means for moving said folders radially to contact with one of the flaps of said carton to fold it down.

71. The combination with means for conveying cartons in an arc of a circle during a portion of their movement, of a folder having a pivotal support at the center of said arc and overhanging the path of the carton, means for imparting to said folder an angular movement about its center of the same angular velocity as the angular velocity of the cartons that circle about said arc and means for moving said folder toward the center of said arc to bring it into engagement with the flaps of cartons.

72. The combination with means for conveying cartons in an arc of a circle during a portion of their movement, of a folder having a pivotal support at the center of said arc and overhanging the path of the cartons, means for imparting to said folder an oscillatory angular motion which, in the direction in which the cartons move, is of the same angular velocity as the movement of the carton, and means for moving the operative end of said folder inward toward the center of said arc to engage the outer flap of a carton and fold it downward.

73. The combination with an endless flexible carton conveyer, of means for directing said conveyer into a path in the form of an arc of a circle during a portion of its movement, a single folder pivotally mounted at the center of said arc and overhanging the path of the carton, means for oscillating said folder at the same angular speed with the carton as they pass about said arc and means for moving said folder toward the center of said arc to operate upon the outer flap of the carton passing about the arc.

74. The combination with a carton conveyer adapted to move cartons continuously in the form of an arc of a circle during a portion of their movement, of an oscillating guide pivoted at the center of said arc, means for oscillating said guide at the same angular velocity with the angular velocity of the cartons passing about said arc and simultaneously with the passage of such cartons, a folder supported by said oscillating guide and capable of movement with respect thereto and means for moving said folder with respect to said guide as the guide moves forward with the carton whereby the folder engages the flaps of the carton.

75. The combination with the carton conveyers adapted to move cartons continuously about an arc of a circle during a portion of their movements, of an oscillating guide pivoted at the center of said arc, means for oscillating said guide about its pivot at the same angular velocity and simultaneously with the passage of cartons about said arc and returning it during the intervals between the passage of cartons, a folder carried by said guide and capable of movement with respect thereto and overhanging the path of said cartons and means for moving said folder toward the center of said arc while said guide is moving in the same angular direction with the cartons whereby said folder engages the flaps of successive cartons to fold them to position.

76. The combination with a carton conveyer adapted to move cartons continuously about an arc of a circle during a portion of their movement, of an oscillating guide pivoted to the center of said arc, means for oscillating said guide about its pivot at the same angular velocity and simultaneously with the passage of the cartons about said arc and returning it during the interval between the passage of the cartons, a folder carried by said guide and capable of movement with respect thereto, and connections between said folder and a stationary portion of the machine, constructed and arranged to move said folder with reference to said guide to engage the carton flaps while said guide is moving in the same angular direction with the cartons.

77. The combination with a carton conveyer adapted to move cartons continuously about an arc of a circle during a portion of their movement, of an oscillating guide pivoted to the center of said arc, means for oscillating said guide about its pivot at the same angular velocity and simultaneously with the passage of the cartons about said arc and returning it during the intervals between the passage of the cartons, a member movable radially through said guide, a link having a stationary pivot connected with said member, whereby as said guide is oscillated said member will be moved radially, and a folder pivoted to said member and means constructed and arranged to swing said folder into engagement with the flaps of the cartons as said member is moved radially.

78. The combination with a carton conveyer adapted to move cartons continuously about an arc of a circle during a portion of their movement, of an oscillating guide pivoted to the center of said arc, means for oscillating said guide about its pivot at the same angular velocity and simultaneously with the passage of the cartons about said arc and returning it during the intervals between the passage of the cartons, a member movable radially through said guide, a link connecting said member with a stationary portion of the structure whereby as the guide is oscillated the member will be moved radially therethrough, a folder pivoted to said member, an arm on the said folder and a link connecting said arm with said guide, whereby as the member is moved radially the folder will be swung downward into engagement with the flaps of the cartons.

79. The combination with a carton conveyer adapted to move cartons continuously about an arc of a circle during a portion of their movement, of an oscillating guide pivoted to the center of said arc, an arm connected to said guide, a continuously-rotating cam, an arm actuated by said cam, a link connecting said arms whereby the guide is oscillated angularly, a member movable through the guide in a radial direction, a link having one end stationarily pivoted and the other connected to said member whereby as the guide is oscillated the member will move radially, a folder pivoted to said member, an arm projecting from said folder and a link connecting said arm and said guide, whereby as the member is moved radially the folder will be swung downward and inward while in angular movement.

80. The combination with a flexible endless carton carrier, of means for guiding said carrier into curves, a rear flap folder pivotally mounted at the center of one curve and means for oscillating the same at the angular speed of the carton, means for moving the folder to engage with the flaps while moving at the speed thereof, a front flap folder and glue-applying means arranged in succession along the path of the cartons, and side flap folders movable about the center of a second curve at the angular speed of the cartons and the means for operating said folder to engage the flaps of the cartons while moving at the speed thereof.

81. The combination with a flexible endless carton conveyer, of means for guiding the carton conveyer into curves in the form of arcs of circles, a rear flap folder, means for imparting to said rear flap folder a rotary movement about the center of one curve at the angular speed of the cartons, means for operating said folder to engage the flaps of the cartons while moving at the angular speed thereof, a front flap folder and glue-applying means arranged in succession along the path of the cartons beyond the rear flap folder, side flap folders rotatably mounted at the center of a second curve, means for imparting to said side flap folders rotary movement at the angular speed of the cartons, and means for operating said folders respectively to engage the flaps of the cartons successively while moving therewith.

82. The combination with a flexible carton conveyer, of means for guiding the conveyer into two curves reversed with respect to each other, a rear flap folder rotatably mounted at the center of oscillation of the first curve, means for imparting to said rear flap folder a rotary movement about its pivot at the angular speed of the cartons, means for imparting to the rear flap folder another movement to bring it into engagement with the rear flaps of the successive cartons, a front flap folder and glue-applying means engaged successively by the cartons in their course, side flap folders rotatably mounted at the center of said second curve, means for moving said side flap folders angularly with the same angular speed as the cartons, and means for operating the folders to bring them into engagement with the side flaps of cartons while moving at the speed thereof.

83. The combination with a continuously-moving, endless, flexible carton conveyer, of means for directing the same into curves, folders for the rear and side flaps rotatably mounted at the centers of curves about which the cartons pass, means for imparting to said folders angular movement of the same angular speed with the cartons, means for imparting to the folders other movements to engage them with the flaps of the cartons respectively while moving at the angular speed thereof.

84. The combination with a carton conveyer adapted to convey cartons continuously in an arc of a circle, of a series of radially positioned brackets pivoted to swing on horizontal pivots, conical pressure rollers journaled in said brackets and above the path of the cartons, and means for rotating said pressure rollers positively with a surface speed equal to the speed of the cartons.

85. The combination with a carton conveyer arranged to move cartons in an arc of a circle, of a series of radially-positioned brackets pivoted adjacent to the center of said arc and arranged to swing on horizontal pivots, conical pressure rollers journaled in said brackets above the path of the cartons, a gear movable with the cartons as they pass about the arc, and pinions having connection with said pressure rollers, whereby the pressure rollers are driven positively with a surface speed substantially equal to that of the cartons.

86. The combination with a series of gluing and folding devices, of a conveyer passing adjacent thereto, a series of carriers for filled cartons mounted upon the conveyer, an ejector finger right angled in form, in the angle of which cartons normally lie, a shaft to which said ejector finger is secured, a spring for holding said ejector finger normally in a retracted position, a projecting arm upon said shaft, and a stationary cam adapted to be engaged by said arm to swing said ejector finger forward to eject the cartons successively.

87. The combination with a carton conveyer, of a series of carriers for filled cartons carried thereby, each having a transversely-extending rear plate or vane, a clamping arm pivoted to the carriers, a toggle lever for operating said clamping arm to swing the same against the cartons to clamp them in position against the rear plate or vane, said toggle lever being constructed and arranged to swing past the dead center, whereby it is self-locking, and means for operating said toggle lever to lock and release it.

88. The combination with a carton conveyer, of a series of carriers for filled cartons thereon, each having a transversely-extending rear plate or vane, a locking arm pivoted to the carriers on a vertical pivot, brackets on the carriers, projecting ears on the locking arms, toggle levers connecting the brackets and locking arms, engaging devices at the pivot of the toggle levers, and a cam adapted to engage said engaging device to swing the pivot of the toggle lever past the dead center, to throw said clamping arm into operative position and to retract the pivot of the toggle lever to release the clamping arm at predetermined points.

89. The combination with a conveyer adapted to move cartons of different sizes through a predetermined path in such position that one of the lateral upper edges of each carton moves in the same path regardless of the size of the carton, of a feed-belt, means for adjusting the discharge end of said feed-belt to position the upper ends of the cartons at the same height regardless of the size of the cartons, and a feed-plunger adapted to move cartons of various sizes from the feed-belt to the conveyer.

90. The combination with a conveyer adapted to convey cartons of various heights with their tops at the same level, of a feeding device for supplying cartons, a feed-plunger, and means for adjusting the discharge end of the feeding device to supply the cartons with their tops at the same level.

91. The combination with a conveyer adapted to receive and move a plurality of cartons of various sizes in such position that one of the lateral upper edges of each carton moves in the same path regardless of the dimensions of the carton, of a side flap folder on that side of the path of the cartons where the edge kept in constant position lies, and means for adjusting said folder to vary its throw while keeping its forward position constant.

92. The combination with a conveyer adapted to receive and move cartons of various sizes in a predetermined path, in such positions that one of the lateral upper edges of each carton moves in the same path regardless of the size of the carton, of a rotatable side flap folder, a stationary cam for reciprocating said folder radially while in rotation, said cam having a vertical face at its advanced point and a beveled face through the rest of its circumference, and means for adjusting the vertical height of said cam to vary the throw of the folder while preserving its forward position constant.

In testimony whereof I hereunto set my hand this 18th day of April 1911.

CHARLIE REDD.

In the presence of two subscribing witnesses:
A. U. THORIEN,
R. A. SCHAEFER.